(12) United States Patent
Imaishi et al.

(10) Patent No.: US 10,960,813 B2
(45) Date of Patent: Mar. 30, 2021

(54) IRRADIATION SYSTEM AND IRRADIATION METHOD

(71) Applicant: Mitsubishi Electric Corporation, Tokyo (JP)

(72) Inventors: Akiko Imaishi, Tokyo (JP); Shinsaku Fukutaka, Tokyo (JP); Munetaka Nishihira, Tokyo (JP); Reiko Sakata, Tokyo (JP); Kei Kasuga, Tokyo (JP); Tsutomu Matsubara, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/626,224

(22) PCT Filed: Jul. 21, 2017

(86) PCT No.: PCT/JP2017/026488
§ 371 (c)(1),
(2) Date: Dec. 23, 2019

(87) PCT Pub. No.: WO2019/016943
PCT Pub. Date: Jan. 24, 2019

(65) Prior Publication Data
US 2020/0114812 A1 Apr. 16, 2020

(51) Int. Cl.
*B60Q 1/34* (2006.01)
*B60Q 1/24* (2006.01)
(Continued)

(52) U.S. Cl.
CPC ............... *B60Q 1/346* (2013.01); *B60Q 1/24* (2013.01); *B60Q 1/22* (2013.01); *B60Q 1/26* (2013.01);
(Continued)

(58) Field of Classification Search
CPC ........ B60Q 1/346; B60Q 1/0023; B60Q 1/24; B60Q 2400/50; B60Q 1/26; B60Q 1/34;
(Continued)

(56) References Cited

U.S. PATENT DOCUMENTS 1,875,676 A * 9/1932 Taplin .................... G09F 21/04
359/520
2,023,845 A * 12/1935 Larose ................. B60Q 1/2607
40/556

(Continued)

FOREIGN PATENT DOCUMENTS

JP 2008-143510 A 6/2008
JP 2014-46838 A 3/2014
(Continued)

OTHER PUBLICATIONS

International Search Report for PCT/JP2017/026488 (PCT/ISA/210) dated Sep. 19, 2017.
(Continued)

*Primary Examiner* — John Fitzgerald
*Assistant Examiner* — Tania Courson
(74) *Attorney, Agent, or Firm* — Birch, Stewart, Kolasch & Birch, LLP

(57) ABSTRACT

A second light device (4b) starts emission of a light pattern B after a first light device (4a) has started emission of a light pattern A. Elements included in the light pattern B and an element included in the light pattern A are arranged on the same straight line.

17 Claims, 14 Drawing Sheets

(51) Int. Cl.
*B60Q 1/22* (2006.01)
*B60Q 1/26* (2006.01)
*B60Q 1/50* (2006.01)
*B60Q 1/32* (2006.01)
*B60Q 1/52* (2006.01)

(52) U.S. Cl.
CPC ............... *B60Q 1/323* (2013.01); *B60Q 1/34* (2013.01); *B60Q 1/50* (2013.01); *B60Q 1/525* (2013.01); *B60Q 2400/50* (2013.01)

(58) Field of Classification Search
CPC . B60Q 1/50; B60Q 1/22; B60Q 1/323; B60Q 1/525
See application file for complete search history.

(56) References Cited

U.S. PATENT DOCUMENTS

| | | | | |
|---|---|---|---|---|
| 2,276,104 | A * | 3/1942 | Shaunessey | B60Q 1/2607 353/13 |
| 5,782,549 | A * | 7/1998 | Glatzmeier | B60Q 1/2611 340/472 |
| 6,422,728 | B1 * | 7/2002 | Riggin | B60Q 1/16 340/475 |
| 6,733,134 | B2 * | 5/2004 | Bleiner | B60Q 1/52 353/13 |
| 6,902,305 | B2 * | 6/2005 | Wainwright | B60Q 1/16 362/485 |
| 6,926,432 | B2 * | 8/2005 | Rodriguez Barros | B60Q 1/2665 362/494 |
| 7,175,321 | B1 * | 2/2007 | Lopez | B60Q 1/50 296/21 |
| 7,192,172 | B1 * | 3/2007 | Alberti | B60Q 1/2665 362/259 |
| 7,287,884 | B2 * | 10/2007 | Koike | B60Q 1/50 362/464 |
| 8,009,977 | B2 * | 8/2011 | Matsuoka | H05B 47/11 396/155 |
| 8,325,027 | B2 * | 12/2012 | Tee | B60Q 1/50 340/432 |
| 8,531,285 | B2 * | 9/2013 | Purks | B60Q 1/50 340/475 |
| 9,610,891 | B2 * | 4/2017 | Yamada | B60R 1/00 |
| 9,688,188 | B2 * | 6/2017 | Son | B60Q 1/50 |
| 9,881,220 | B2 * | 1/2018 | Koravadi | G06K 9/00825 |
| 9,978,280 | B2 * | 5/2018 | Lee | G01C 21/3697 |
| 10,040,392 | B2 * | 8/2018 | Salter | H05B 47/105 |
| 10,065,557 | B2 * | 9/2018 | Imaishi | B60Q 1/444 |
| 10,134,280 | B1 * | 11/2018 | You | B60Q 1/34 |
| 10,195,980 | B2 * | 2/2019 | Widdowson | B60Q 1/50 |
| 10,220,770 | B2 * | 3/2019 | Son | B60Q 1/346 |
| 10,284,822 | B2 * | 5/2019 | Murar | B60R 1/1207 |
| 10,351,054 | B2 * | 7/2019 | Rodriguez Barros | B60Q 1/2669 |
| 10,384,594 | B2 * | 8/2019 | Cerrano | B60Q 1/24 |
| 10,589,716 | B2 * | 3/2020 | Sobecki | G06F 3/04817 |
| 10,723,351 | B1 * | 7/2020 | Hakki | B60W 30/09 |
| 2003/0169160 | A1 * | 9/2003 | Rodriguez Barros | B60R 1/1207 340/426.1 |
| 2005/0117364 | A1 * | 6/2005 | Rennick | B60Q 1/2665 362/540 |
| 2007/0159311 | A1 * | 7/2007 | Schober | B60Q 5/00 340/435 |
| 2009/0013922 | A1 * | 1/2009 | Lin | B60Q 1/38 116/28 R |
| 2010/0253919 | A1 * | 10/2010 | Douglas | G03B 21/14 353/13 |
| 2013/0010484 | A1 | 1/2013 | Son et al. | |
| 2013/0335212 | A1 | 12/2013 | Purks et al. | |
| 2014/0062685 | A1 | 3/2014 | Tamatsu et al. | |
| 2015/0203023 | A1 | 7/2015 | Marti et al. | |
| 2017/0166111 | A1 | 6/2017 | Baccarin et al. | |
| 2017/0203685 | A1 | 7/2017 | Hirai et al. | |
| 2017/0267167 | A1 | 9/2017 | Sakata et al. | |
| 2018/0093607 | A1 * | 4/2018 | Omanovic | B60Q 1/22 |
| 2019/0016257 | A1 * | 1/2019 | Sakata | G07C 5/0825 |

FOREIGN PATENT DOCUMENTS

| | | |
|---|---|---|
| JP | 2015-132707 A | 7/2015 |
| JP | 2015-137097 A | 7/2015 |
| WO | WO 2016/027314 A1 | 2/2016 |
| WO | WO 2016/027315 A1 | 2/2016 |

OTHER PUBLICATIONS

Japanese Office Action dated Apr. 24, 2018 in Japanese Patent Application No. 2018-506353.
Japanese Office Action dated Aug. 7, 2018 in Japanese Patent Application No. 2018-506353.

* cited by examiner

IRRADIATION SYSTEM AND IRRADIATION METHOD

TECHNICAL FIELD

The present invention relates to an irradiation system and an irradiation method for emitting a light pattern including a single or a plurality of light elements having a certain shape.

BACKGROUND ART

Conventionally, a technique has been proposed in which an image is projected outside a vehicle to raise attention of surrounding vehicles or pedestrians to the presence of the vehicle.

For example, a roadway projection system described in Patent Literature 1 specifies the driving operation that a driver is going to perform and determines an instruction for assisting the driver in performing the identified driving operation. An image projector projects an image indicating the instruction onto the outside of the vehicle (see FIG. 1A of Patent Literature 1).

CITATION LIST

Patent Literature

Patent Literature 1: JP 2015-137097 A

SUMMARY OF INVENTION

Technical Problem

The image projector described in Patent Literature 1 is a relatively large irradiation system such as a laser projection system, a liquid crystal display projector, a three-dimensional projector, or a video projector.

As described above, the system described in Patent Literature 1 is capable of emitting a complicated light pattern by a large-scale irradiation system.

However, the conventional technique represented by Patent Literature 1 assumes a large-scale irradiation system. For this reason, it is difficult to implement so-called animation emission, in which the irradiation state of the light pattern appears to be continuously changing, by a simple configuration including two irradiation units that emits a light pattern including a light element having a certain shape.

This invention solves the above disadvantage, and it is an object of the present invention to obtain an irradiation system and an irradiation method which can implement animation emission with a simple structure.

Solution to Problem

An irradiation system according to the present invention includes a first irradiator to emit a first light pattern including a single element, a second irradiator to emit a second light pattern including multiple elements each aligned in a direction away from the single element, the second light pattern aligned in an area away from the single element, and a controller to control the first irradiator and the second irradiator so that the second irradiator starts emission of the second light pattern after the first irradiator has started emission of the first light pattern.

Advantageous Effects of Invention

According to the present invention, a first irradiation unit and a second irradiation unit are controlled so that emission of a first light pattern including a single element starts first and then emission of a second light pattern including a single or a plurality of elements aligned in a direction away from the single element starts.

As a result, the animation emission can be implemented with a simple configuration.

DESCRIPTION OF EMBODIMENTS

To describe the present invention further in detail, embodiments for carrying out the invention will be described below with reference to the accompanying drawings.

First Embodiment

Figure 1:
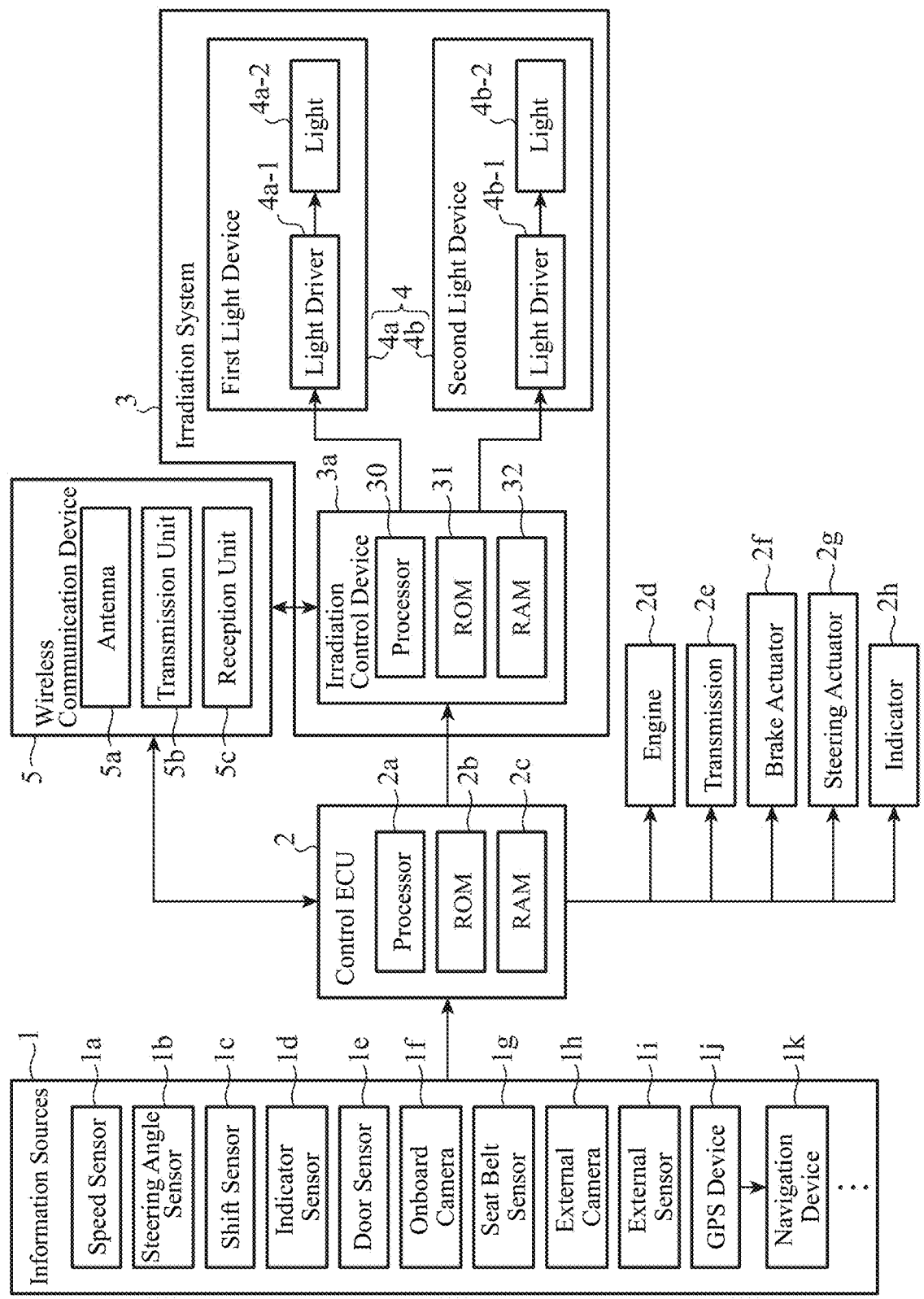
FIG. 1 is a block diagram illustrating a hardware configuration of a first embodiment of the present invention.

FIG. 1 is a block diagram illustrating a hardware configuration according to a first embodiment of the present invention. A vehicle in the first embodiment includes information sources 1 including various sensors.

A control electronic control unit (ECU) 2 is capable of controlling hardware, which is a control target, on the basis of information obtained from the information sources 1.

The information sources 1 include a speed sensor 1a, a steering angle sensor 1b, a shift sensor 1c, an indicator sensor 1d, a door sensor 1e, an onboard camera 1f, a seat belt sensor 1g, an external camera 1h, an external sensor 1i, a GPS device 1j, and a navigation device 1k.

The control ECU 2 outputs information received via a controller area network (CAN) to an irradiation control device 3a of an irradiation system 3. The irradiation control device 3a controls a first light device 4a and a second light device 4b on the basis of the information input from the control ECU 2. The control ECU 2 receives information detected by each of the plurality of sensors included in the information sources 1 or images formed by the cameras included in the information sources 1.

The speed sensor 1a detects the speed of the vehicle and outputs an electric signal (speed pulse) corresponding to the wheel speed to the control ECU 2. The steering angle sensor 1b detects the steering angle of the vehicle, and outputs an electric signal corresponding to the steering angle to the control ECU 2. The shift sensor 1c detects the current state (or a change) of the shift lever, and outputs shift operation information of the shift lever such as a shift change by an occupant to the control ECU 2.

The indicator sensor 1d detects the operation of the indicator (direction indicator), and outputs information of an indicator operation instruction to the control ECU 2 when the driver operates the indicator. The door sensor 1e detects opening/closing of the doors of the vehicle, and outputs door opening/closing information to the control ECU 2. The onboard camera 1f is provided facing the driver's seat of the vehicle, and forms an image of a driver seated on the driver's seat. The onboard camera 1f forms the image the driver's face or the upper body and outputs the formed image to the control ECU 2.

The seat belt sensor 1g detects attachment/detachment of the seat belt, and outputs attachment/detachment information of the seat belt to the control ECU 2. The external camera 1h is a camera that images the outside of the vehicle. For example, the external camera 1h is provided at each of the front, rear, left, and right sides of the vehicle, and images formed in the respective directions by the external cameras 1h are output to the control ECU 2. The control ECU 2 executes detection and recognition of a target object such as a pedestrian, a vehicle, or an obstacle outside the vehicle on the basis of the formed images input from the external cameras 1h.

The external sensor 1i detects an object present outside the vehicle, and can be implemented by, for example, an ultrasonic sensor, a radar sensor, a millimeter wave radar sensor, or an infrared laser sensor. The external sensor 1i outputs detection information to the control ECU 2.

The control ECU 2 detects the distance between the vehicle and the object and the position of the object on the basis of the detection information of the object input from the external sensor 1i. The detection of the distance between the vehicle and the object and the position of the object may be performed by the control ECU 2 as described above, or the external sensor 1i itself may perform the detection and output the detection result to the control ECU 2.

The global positioning system (GPS) device 1j detects the position of the vehicle using radio waves transmitted from GPS satellites, and outputs the position coordinates of the vehicle to the control ECU 2 and the navigation device 1k.

The navigation device 1k has a function of calculating a recommended route to a destination of the vehicle on the basis of the vehicle position and map information.

Moreover, the navigation device 1k may calculate a recommended route of the vehicle on the basis of information such as congestion information and road closure information around the vehicle acquired in communication with an external device.

The navigation device 1k may receive a recommended route calculated by a server on the basis of the position information and destination information of the vehicle. The navigation device outputs route information of the vehicle to the control ECU 2.

The control ECU 2 has a function of controlling the entire vehicle. As illustrated in FIG. 1, the control ECU 2 includes a processor 2a, a read only memory (ROM) 2b, and a random access memory (RAM) 2c. The processor 2a is a calculation processing circuit that performs various types of calculation processing in the control ECU 2, and is hardware called a processor, a calculation processing circuit, an electric circuit, a controller, or the like. The processor 2a includes a set of one or more calculation processing circuits. The processor 2a is capable of reading a program from the ROM 2b and deploying the program on the RAM 2c to execute calculation processing.

The ROM 2b is a non-volatile storage device for storing one or more programs.

The RAM 2c is a volatile storage device that the processor 2a uses as a deployment area for programs and various types of information.

The ROM 2b and the RAM 2c include, for example, a semiconductor storage device and may be called a memory as well.

Although the ROM 2b has been described as an exemplary storage device storing programs to be executed by the processor 2a, a storage device is not limited to this. For example, a storage device may be a nonvolatile large-capacity storage device called a storage such as a hard disk drive (HDD) or a solid state drive (SSD). Alternatively, the storage devices including a storage may be collectively called a memory. The same also applies to the irradiation control device 3a to be described later.

An engine 2d is a power source for driving the vehicle, and generates power for rotating the wheels by burning fuel. The engine 2d can operate also by an instruction from the control ECU 2. A transmission 2e transmits the power generated in the engine 2d to the wheels. The transmission 2e is capable of changing the torque transmitted to the wheels by changing gears on the basis of an instruction from the control ECU 2.

A brake actuator 2f is a mechanism for operating the brake (decelerator) of the vehicle, and is capable of operating the brake on the basis of an instruction from the control ECU 2 to decelerate the vehicle. A steering actuator 2g is a mechanism for operating the steering (steering device) of the vehicle, and is capable of controlling the steering on the basis of an instruction by the control ECU 2 to control the traveling direction of the vehicle. An indicator 2h is a direction indicator that indicates the traveling direction of the vehicle, and blinks on the basis of an instruction from the control ECU 2 to externally indicate the traveling direction of the vehicle.

The irradiation system 3 according to the first embodiment includes the irradiation control device 3a, the first light device 4a, and the second light device 4b.

The vehicle of the first embodiment has a function to provide the state of the vehicle, display of an operation intention, or warning for the surroundings of vehicle with an animation including a light pattern emitted from the first light device 4a and a light pattern emitted from the second light device 4b.

The irradiation control device 3a controls emission of light patterns by the light devices 4. The term light devices 4 collectively refers to the first light device 4a and the second light device 4b.

Note that although the case where the first light device 4a and the second light device 4b are separate light devices has been described in the first embodiment, these may be integrated.

The irradiation control device 3a includes a processor 30, a ROM 31, and a RAM 32, like the control ECU 2.

The processor 30 is a calculation processing circuit that performs various types of calculation processing in the irradiation control device 3a, and is hardware called a processor, a calculation processing circuit, an electric circuit, or a controller. The processor 30 includes a set of one or more calculation processing circuits. The processor 30 is capable of reading a program from the ROM 31 and deploying the program on the RAM 32 to execute calculation processing.

The first light device 4a is a first irradiation unit that emits a light pattern A to an area near the vehicle body outside the vehicle. The light pattern A is a first light pattern, for example, a rectangular pattern.

The first light device 4a includes a light driver 4a-1 and a light 4a-2. The light driver 4a-1 is a driving device that causes the light 4a-2 to emit light, and the light pattern A is emitted by the light 4a-2.

The light driver 4a-1 controls irradiation timing and irradiation time of the light 4a-2 on the basis of an instruction from the irradiation control device 3a.

The second light device 4b is a second irradiation unit that emits the light pattern B to an area which is adjacent to the irradiation area of the light pattern A and away from the vehicle body. The light pattern B is a second light pattern, for example, a rectangular pattern.

The second light device 4b has a light driver 4b-1 and a light 4b-2. The light driver 4b-1 is a driving device that causes the light 4b-2 to emit light, and the light pattern B is emitted by the light 4b-2.

The light driver 4b-1 controls irradiation timing and irradiation time of the light 4b-2 on the basis of an instruction from the irradiation control device 3a.

Note that the first light device 4a and the second light device 4b may be provided in the same housing.

A wireless communication device 5 performs wireless communication with an external communication device.

For example, in the wireless communication device 5, a transmission unit 5b transmits a radio signal indicating the state of the vehicle to a remote operation terminal via an antenna 5a, and a reception unit 5c receives a remote operation signal of the vehicle from the remote operation terminal via the antenna 5a. The remote operation signal is output from the wireless communication device 5 to the control ECU 2, and the control ECU 2 operates the vehicle on the basis of the remote operation signal.

Figure 2:
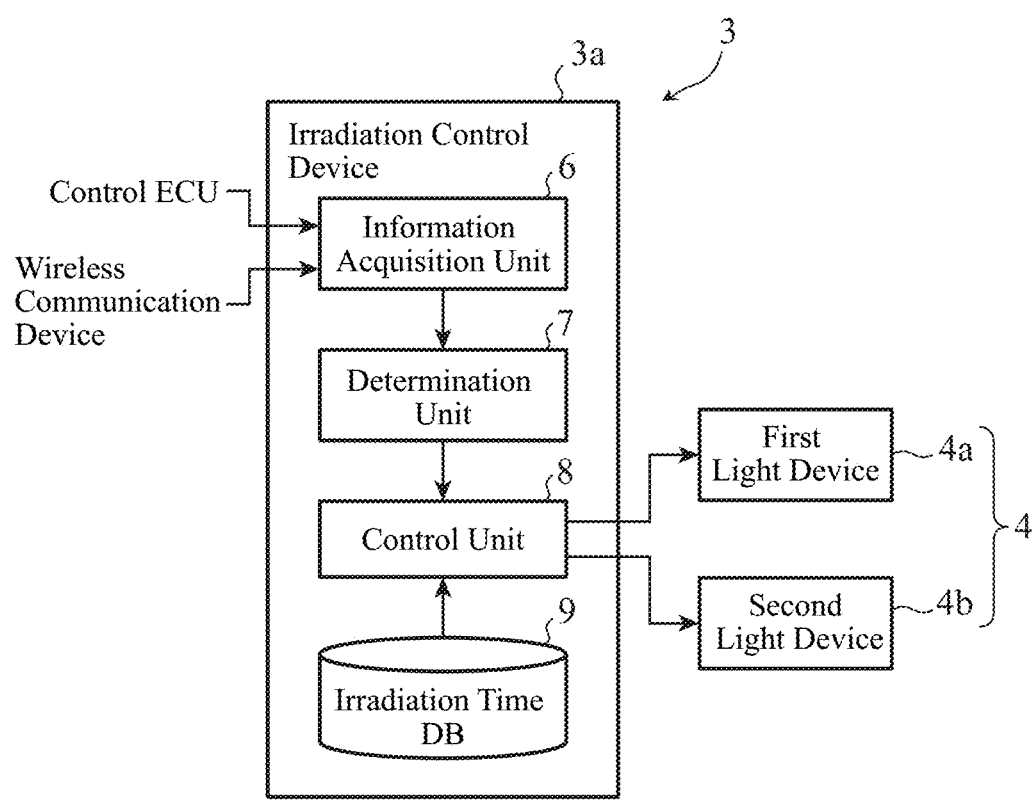
FIG. 2 is a block diagram illustrating a functional configuration of an irradiation system according to the first embodiment.

FIG. 2 is a block diagram illustrating a functional configuration of the irradiation system 3 according to the first embodiment.

The irradiation control device 3a includes an information acquisition unit 6, a determination unit 7, a control unit 8, and an irradiation time database (hereinafter referred to as DB) 9. The information acquisition unit 6 acquires information inside and outside the vehicle.

Information acquired by the information acquisition unit 6 includes, for example, shift lever operation information, door opening/closing information, seat belt attachment/detachment information, vehicle operation information, steering angle information, indicator operation information, detection information and recognition information of an object present around the vehicle, driver state information, a remote operation signal of the vehicle, and route information of the vehicle.

The determination unit 7 determines whether the vehicle is in a situation where the light patterns are to be emitted on the basis of the information inside and outside the vehicle acquired by the information acquisition unit 6.

For example, in a case where the determination unit 7 determines that the shift lever has switched to drive or reverse on the basis of the shift lever operation information, the determination unit 7 determines that the light patterns are to be emitted onto a road surface in front of or behind the vehicle.

When the determination unit 7 determines that an obstacle (for example, a pedestrian) has entered in the traveling direction of the vehicle on the basis of the detection information and the recognition information of the object, the determination unit 7 determines that the light patterns are to be emitted onto the road surface in front of the vehicle.

When the determination unit 7 determines that indicator operation has been performed on the basis of the indicator operation information, the determination unit 7 determines that the light patterns are to be emitted onto a road surface in the direction indicated by the indicator.

When the determination unit 7 determines that there is a stopped vehicle on the traveling lane of the vehicle on the basis of the detection information and the recognition information of the object, the determination unit 7 determines that the light patterns are to be emitted onto a road surface in a direction avoiding the stopped vehicle.

When the determination unit 7 determines that it is timing to guide the driver to turn left or right on the basis of the route information of the vehicle, the determination unit 7 determines that the light patterns are to be emitted onto a road surface in the guided direction.

When the determination unit 7 determines that a seat belt has been unfastened on the basis of the seat belt attachment/detachment information, the determination unit 7 determines that the light patterns are to be emitted onto a road surface on the door side.

When the determination unit 7 determines that the driver is about to open a door on the basis of the driver state information, the determination unit 7 determines that the light patterns are to be emitted onto a road surface on the door side.

The determination unit 7 determines that the light patterns are to be emitted onto a road surface in a direction in which the vehicle operates when the vehicle operates in response to a remote operation signal.

When the determination unit 7 determines that a situation where a door is to be opened by an occupant on the basis of the door opening/closing information, the determination unit 7 determines that the light patterns are to be emitted onto the road surface on the door side.

Moreover, the determination unit 7 determines that the vehicle is not in a situation where the light patterns are to be emitted on the basis of information inside and outside the vehicle acquired by the information acquisition unit 6.

For example, when the determination unit 7 determines that the shift lever has been switched to parking or neutral on the basis of the shift lever operation information while light patterns are emitted onto a road surface in front of or behind the vehicle, the determination unit 7 determines that the vehicle is not in a situation where the light patterns are to be emitted.

When the determination unit 7 determines that the vehicle speed is faster than or equal to 5 km/h on the basis of the vehicle operation information while light patterns are emitted onto a road surface in front of or behind the vehicle, the determination unit 7 determines that the vehicle is not in a situation where the light patterns are to be emitted.

When the determination unit 7 determines that blinking of the indicator has been stopped on the basis of the indicator operation information while light patterns are emitted onto a road surface in a direction indicated by the indicator, the determination unit 7 determines that the vehicle is not in a situation where the light patterns are to be emitted.

When the determination unit 7 determines that blinking of the indicator has been stopped on the basis of the indicator operation information while light patterns are emitted onto a road surface in a direction to avoid a right/left-turning vehicle or a stopped vehicle, the determination unit 7 determines that the vehicle is not in a situation where the light patterns are to be emitted.

When the determination unit 7 determines that a door has been opened from a closed state or has been closed from an opened state on the basis of the door opening/closing information while light patterns are emitted onto the road surface on the door side, the determination unit 7 determines that the vehicle is not in a situation where the light patterns are to be emitted.

When the determination unit 7 determines that a certain period of time has elapsed since completion of the operation of the vehicle on the basis of the remote operation signal of the vehicle while light patterns are emitted onto a road surface in a direction in which the vehicle operates, the determination unit 7 determines that the vehicle is not in a situation where the light patterns are to be emitted.

The determination unit 7 determines that the vehicle is not in a situation where the light patterns are to be emitted when reception of a remote operation signal of the vehicle stops while light patterns are emitted onto a road surface in a direction in which the vehicle operates.

The control unit 8 controls and causes the first light device 4*a* and the second light device 4*b* to repeat emission in the order of the light pattern A to the light pattern B.

The irradiation time DB 9 stores a combination of irradiation time information of the light pattern A and irradiation time information of the light pattern B for each animation. An animation refers to one of irradiation modes of the light pattern A and the light pattern B, and allows an irradiation state of each of the light pattern A and the light pattern B to appear to be changing continuously.

For example, the control unit 8 reads, from the irradiation time DB 9, irradiation time information of the light pattern A and irradiation time information of the light pattern B corresponding to an animation to be emitted.

The control unit 8 controls and causes the light driver 4*a*-1 to turn on and off the light 4*a*-2 on the basis of the irradiation time information of the light pattern A, and controls and causes the light driver 4*b*-1 to turn on and off the light 4*b*-2 on the basis of the irradiation time information of the light pattern B.

As a result, an animation in which the light pattern A and the light pattern B are repeatedly emitted in the order of the light pattern A to the light pattern B is emitted onto a road surface outside the vehicle.

Figure 3A:
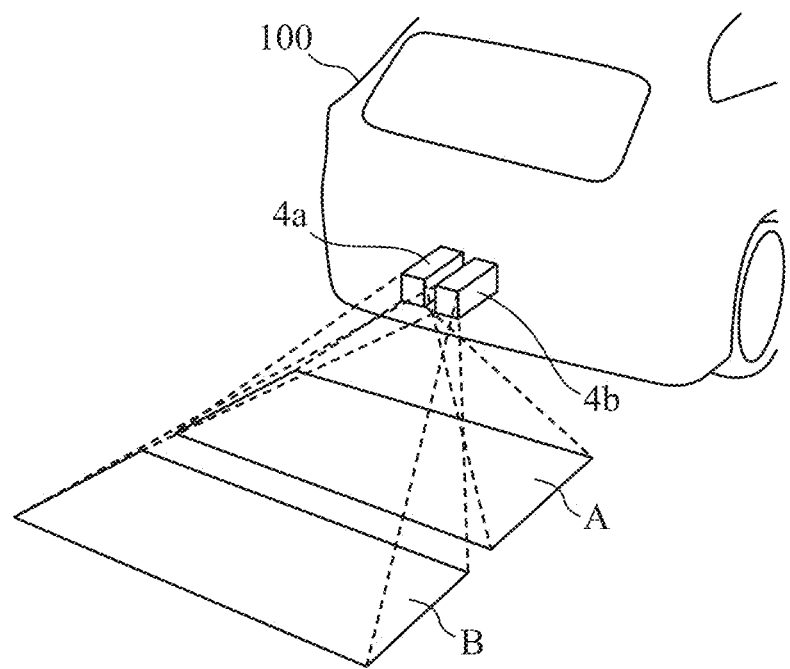
FIG. 3A is a diagram illustrating a state in which an animation of the first embodiment is emitted onto a road surface behind a vehicle.
Figure 3B:
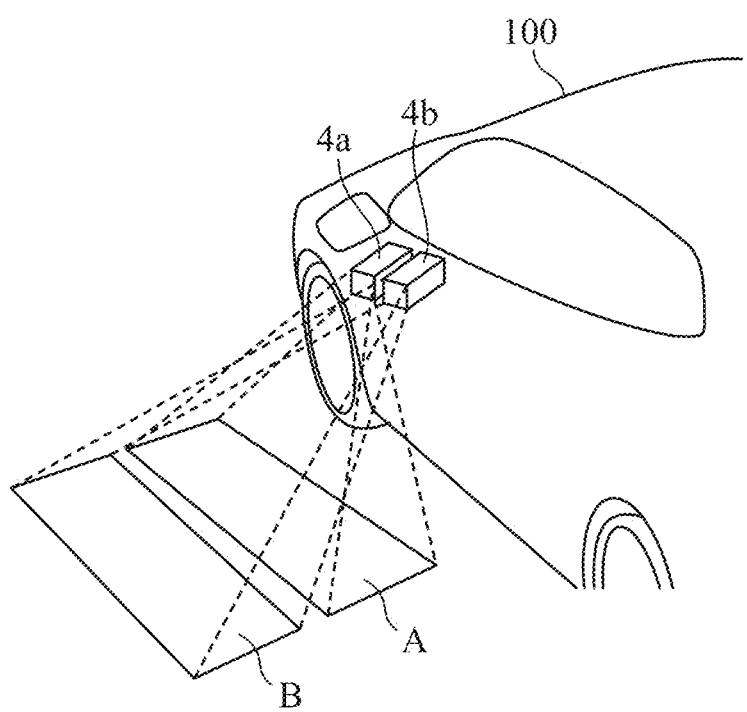
FIG. 3B is a diagram illustrating a state in which the animation of FIG. 3A is emitted onto a road surface on a side of the vehicle.

FIG. 3A is a diagram illustrating a state in which the animation of the first embodiment is emitted onto the road surface behind the vehicle 100. FIG. 3B is a diagram illustrating a state in which the animation of the first embodiment is emitted onto a road surface on a side of the vehicle 100. The animations illustrated in FIGS. 3A and 3B include a rectangular light pattern A and a rectangular light pattern B. Each of the light pattern A and the light pattern B includes a single light element having the same area, and the light pattern B is arranged on the same straight line as the light pattern A. That is, the light pattern B is aligned in a direction away from the light pattern A.

Figure 4:
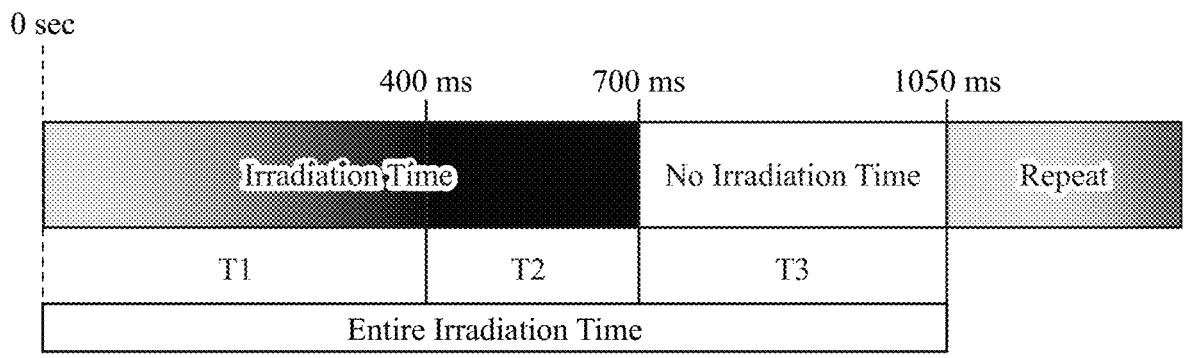
FIG. 4 is a timing chart illustrating animation irradiation processing of the first embodiment.

FIG. 4 is a timing chart illustrating irradiation processing of the animation in the first embodiment, illustrating irradiation processing of the animations illustrated in FIGS. 3A and 3B. In FIG. 4, the irradiation time of the animation is represented in a band shape, and the brightness (lightness) of the animation is represented by black shading applied to the band-shaped portion. A darker band-shaped portion indicates that a higher lightness of the animation.

In a time range T1 (0 to 400 milliseconds (hereinafter referred to as "ms")), the first light device 4*a* starts emission of the light pattern A to an area closer to the vehicle 100, and then the second light device 4*b* starts emission of the light pattern B to an area far from the vehicle 100. At this point, the control unit 8 controls and causes the first light device 4*a* and the second light device 4*b* to gradually increase the brightness of both the light pattern A and the light pattern B to 100% (maximum value).

In a time range T2 (400 to 700 ms), the control unit 8 controls the brightness of each of the light pattern A and the light pattern B to 100%. That is, in the time range T2, both the light 4*a*-2 of the first light device 4*a* and the light 4*b*-2 of the second light device 4*b* are lit.

In a time range T3 (700 to 1050 ms), the control unit 8 controls the brightness of each of the light pattern A and the light pattern B to 0%. That is, in the time range T3, both the light 4*a*-2 of the first light device 4*a* and the light 4*b*-2 of the second light device 4*b* are turned off.

Turning on and off the lights 4*a*-2 and 4*b*-2 in the time ranges T1 to T3 results in a series of irradiation operations of the animation, and the series of irradiation operations is repeatedly executed.

The control unit 8 controls and causes the first light device 4*a* and the second light device 4*b* to repeat emission in the order of the light pattern A to the light pattern B for example when an animation emission switch is operated by an occupant of the vehicle 100.

Moreover, the control unit 8 may control and cause the first light device 4a and the second light device 4b to repeat emission in the order of the light pattern A to the light pattern B when the determination unit 7 determines that the vehicle 100 is in a situation where the light patterns are to be emitted.

For example when the determination unit 7 determines that the shift lever has been switched to reverse on the basis of the shift lever operation information, the determination unit 7 determines that the light patterns are to be emitted to the road surface behind the vehicle. In accordance with the determination result of the determination unit 7, the control unit 8 controls and causes the light device 4 arranged behind the vehicle 100 to repeat emission in the order of the light pattern A to the light pattern B on the road surface in the backward traveling direction of the vehicle 100 as illustrated in FIG. 3A.

When the determination unit 7 determines that a seat belt has been unfastened on the basis of the seat belt attachment/detachment information, the determination unit 7 determines that the light patterns are to be emitted onto a road surface on the door side.

In accordance with the determination result of the determination unit 7, the control unit 8 controls and causes the light device 4 arranged on a side of the vehicle 100 to repeat emission in the order of the light pattern A to the light pattern B on a road surface on the side of the vehicle 100 as illustrated in FIG. 3B.

As a result, the light patterns can be emitted when the vehicle is in a situation where the light patterns are to be emitted, and thus it becomes possible to appropriately raise attention to the presence of the vehicle with respect to the surroundings of the vehicle.

Next, the operation will be described.

Figure 5:
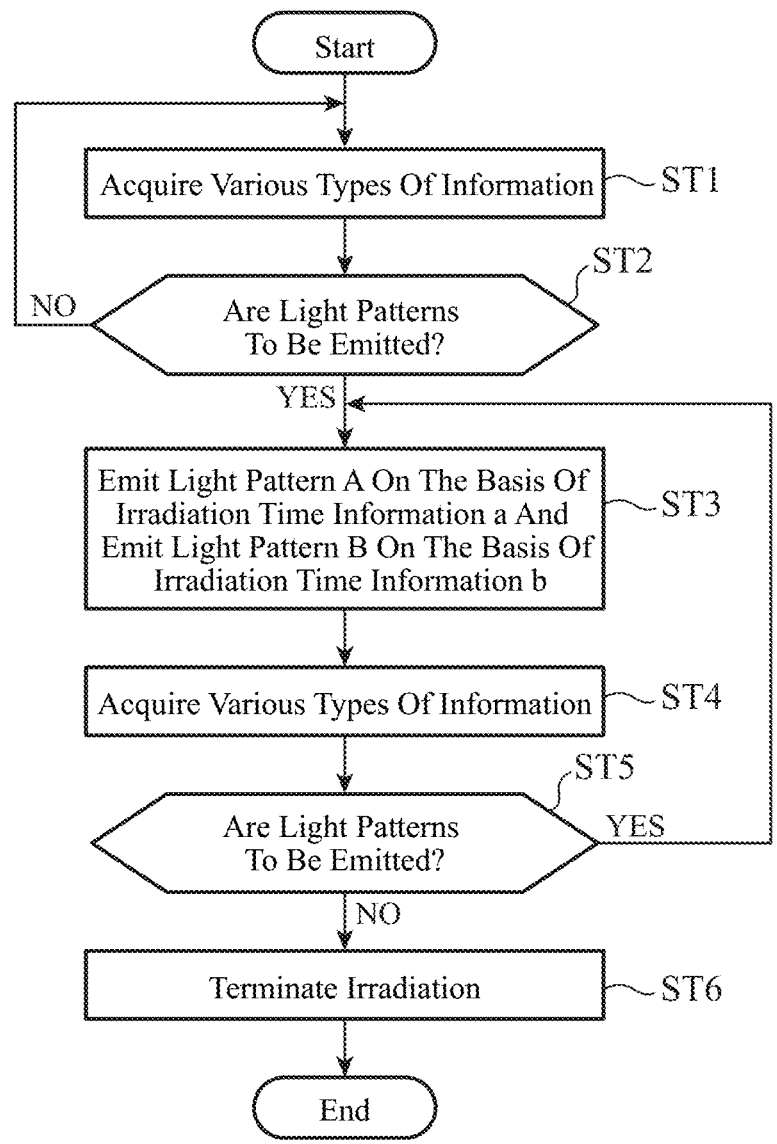
FIG. 5 is a flowchart illustrating an irradiation method according to the first embodiment.

FIG. 5 is a flowchart illustrating an irradiation method according to the first embodiment, illustrating a series of processing procedures from the start to the end of emission of the animation outside the vehicle.

Hereinafter, a case where an animation is emitted behind the vehicle 100 illustrated in FIG. 3A will be described as an example.

In step ST1, the information acquisition unit 6 acquires various types of information inside and outside the vehicle. Various types of information inside and outside the vehicle include information acquired from the information sources 1 illustrated in FIG. 1 and information received from an external device by the wireless communication device 5. The information acquired by the information acquisition unit 6 is output to the determination unit 7. Examples include shift lever operation information, door opening/closing information, seat belt attachment/detachment information, vehicle operation information, steering angle information, indicator operation information, detection information and recognition information of an object present around the vehicle, driver state information, a remote operation signal of the vehicle, and route information of the vehicle.

The determination unit 7 determines whether the vehicle 100 is in a situation where the light patterns are to be emitted on the basis of the information acquired by the information acquisition unit 6 (step ST2).

If the determination unit 7 determines that the vehicle 100 is not in a situation where the light patterns are to be emitted (step ST2: NO), the processing returns to step ST1, and the above processing is repeated.

On the other hand, if it is determined that the vehicle 100 is in a situation where the light patterns are to be emitted (step ST2: YES), the determination unit 7 outputs information indicating the situation of the vehicle 100 to the control unit 8.

For example, in a case where the determination unit 7 determines that the shift lever has switched from parking or neutral to reverse on the basis of the shift lever operation information, the determination unit 7 determines that the light patterns are to be emitted onto the road surface behind the vehicle 100.

When the determination unit 7 determines that the light patterns are to be emitted onto the road surface behind the vehicle 100, the control unit 8 reads irradiation time information a of the light pattern A and irradiation time information b of the light pattern B corresponding to the animation to be emitted from the irradiation time DB 9.

Figure 6A:
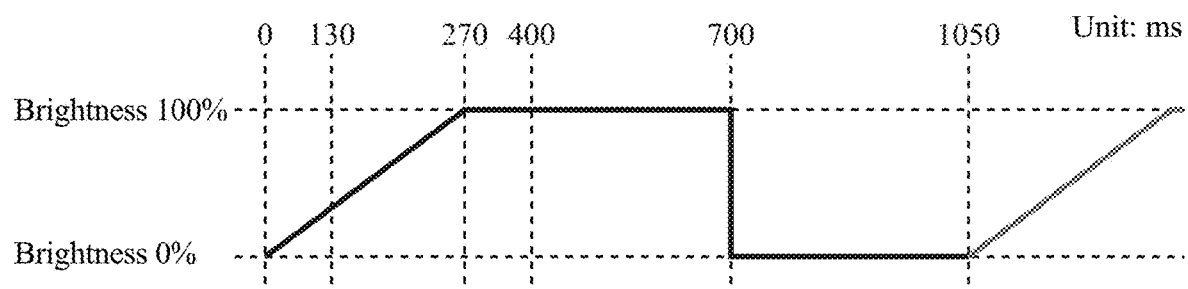
FIG. 6A is a timing chart illustrating irradiation processing of a light pattern A in the first embodiment.
Figure 6B:
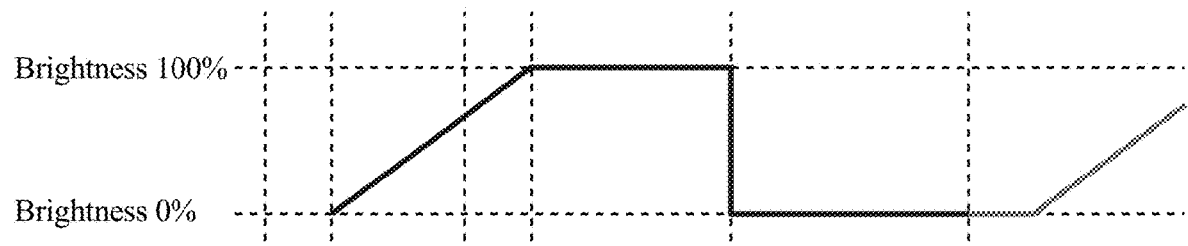
FIG. 6B is a timing chart illustrating irradiation processing of a light pattern B in the first embodiment.

For example, FIG. 6A is a timing chart illustrating the irradiation processing of the light pattern A in the first embodiment, and the irradiation time information a of the light pattern A is information indicating the relationship between the brightness and time of the light pattern A in FIG. 6A. FIG. 6B is also a timing chart illustrating the irradiation processing of the light pattern B in the first embodiment, and the irradiation time information b of the light pattern B is information indicating the relationship between the brightness and time of the light pattern B in FIG. 6B.

The control unit 8 controls and causes the light driver 4a-1 to repeat turning on and off the light 4a-2 on the basis of the irradiation time information a of the light pattern A, and controls and causes the light driver 4b-1 to repeat turning on and off the light 4b-2 on the basis of the irradiation time information b of the light pattern B.

Figure 7:
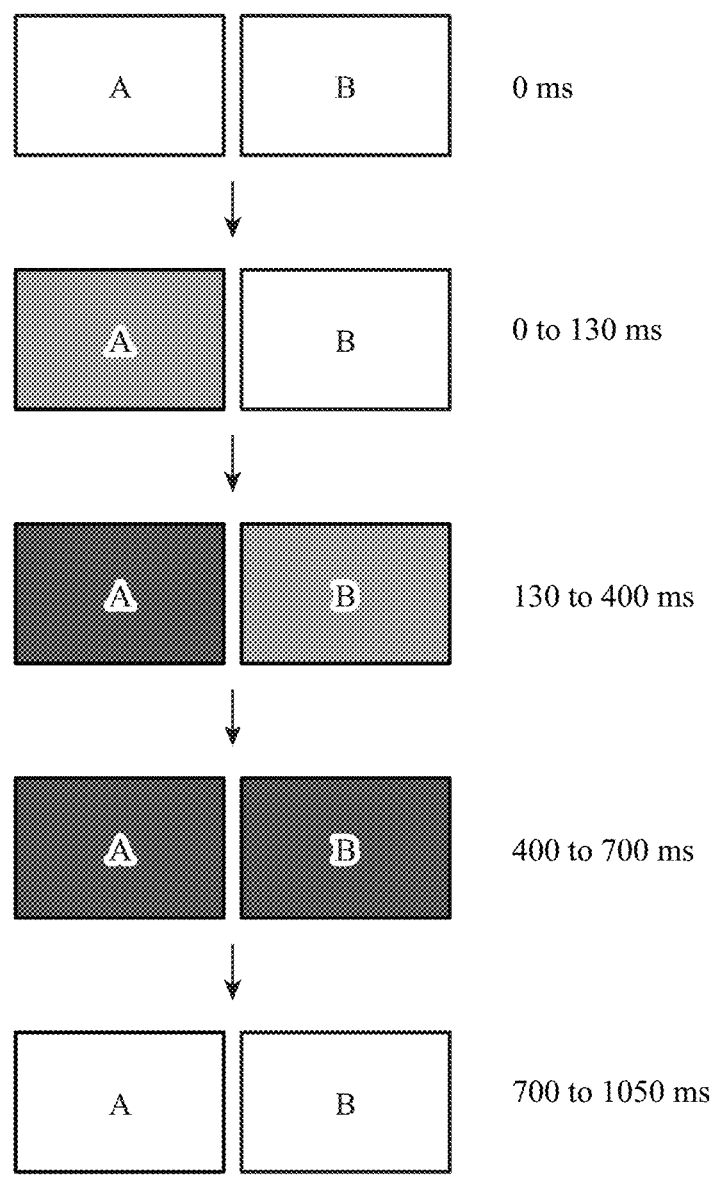
FIG. 7 is a diagram illustrating time-series changes in brightness of the light pattern A in FIG. 6A and the light pattern B in FIG. 6B.

FIG. 7 is a diagram illustrating time-series changes in the brightness of the light pattern A in FIG. 6A and the light pattern B in FIG. 6B. At 0 ms when emission of the light pattern A is started by the control unit 8, as illustrated in FIG. 7, the brightness of the light pattern A and the light pattern B is 0%.

The control unit 8 controls and causes the light driver 4a-1 to start lighting the light 4a-2 from the time point of 0 ms on the basis of the irradiation time information a of the light pattern A illustrated in FIG. 6A.

That is, in a time range of 0 to 130 ms, only the light pattern A becomes bright and the light pattern A appears in the area near the vehicle body behind the vehicle 100 as illustrated in FIG. 7.

The control unit 8 controls and causes the light driver 4b-1 to start lighting the light 4b-2 on the basis of the irradiation time information b of the light pattern B illustrated in FIG. 6B from a time point of 130 ms.

In a time range of 130 to 400 ms, the light pattern A becomes 100% bright and the light pattern B becomes about 80% bright at a time point of 270 ms as illustrated in FIG. 7. When it reaches 400 ms, the brightness of the light pattern B also becomes 100%.

Thereafter, in a time range of 400 to 700 ms, 100% brightness is maintained for both the light pattern A and the light pattern B as illustrated in FIG. 7. In a time range of 700 to 1050 ms, the control unit 8 controls and causes the light driver 4a-1 and the light driver 4b-1 to turn off the lights 4a-2 and 4b-2.

In this manner, by matching the timing of stopping the emission of the light pattern A and the timing of stopping the emission of the light pattern B, it becomes possible to visually and clearly recognize the beginning and the end of the animation including the light pattern A and the light pattern B.

The control unit 8 controls and causes the light driver 4a-1 to start lighting the light 4a-2 from a time point of 1050 ms on the basis of the irradiation time information a of the light pattern A.

The control unit 8 controls and causes the light driver 4b-1 to start lighting the light 4b-2 with a delay of 130 ms on the basis of the irradiation time information b of the light pattern B in addition to the lighting of the light 4a-2. Thereafter, the control unit 8 performs irradiation processing similar to that described above.

As a result, an animation in which the light pattern A and the light pattern B are repeatedly emitted in the order mentioned is emitted to the road surface behind the vehicle 100 as illustrated in FIG. 3A. The above processing corresponds to step ST3.

The information acquisition unit 6 keeps acquiring various types of information inside and outside the vehicle even after the emission of the animation on the road surface behind the vehicle 100 has started (step ST4). The information acquired by the information acquisition unit 6 is output to the determination unit 7.

The determination unit 7 determines whether the vehicle 100 is in a situation where the light patterns are to be emitted on the basis of the information acquired by the information acquisition unit 6 (step ST5).

Determination unit 7 determines that vehicle 100 is in a situation where the light patterns are to be emitted when the vehicle 100 is travelling backward while the shift lever remains in reverse (step ST5: YES).

In this case, the processing returns to step ST3, and the emission of the animation is continued.

On the other hand, if it is determined that the vehicle 100 is not in a situation where the light patterns are to be emitted (step ST5: NO), the determination unit 7 outputs information indicating the situation of the vehicle 100 to the control unit 8.

For example when the determination unit 7 determines that the shift lever has been switched from reverse to parking on the basis of the shift lever operation information, the determination unit 7 determines that the light patterns are not to be emitted to the road surface behind the vehicle 100.

When the determination unit 7 determines that the light patterns are not to be emitted to the road surface behind the vehicle 100, the control unit 8 controls and causes the light driver 4a-1 and the light driver 4b-1 to turn off the light 4a-2 and the light 4b-2. As a result, the emission of the animation is terminated (step ST6).

Note that in a case where light sources, incapable of gradually increasing the brightness and merely capable of controlling the brightness to either 0% or 100%, are used as light sources of the light 4a-2 and the light 4b-2, emission of the light patterns may be controlled as follows.

Figure 8A:
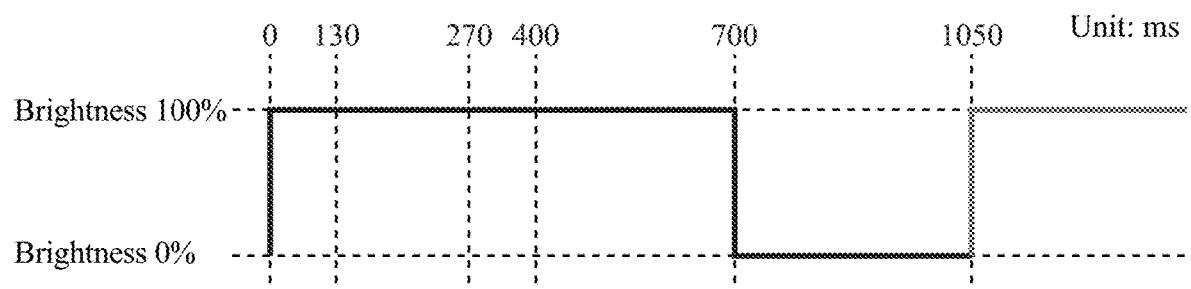
FIG. 8A is a timing chart illustrating other irradiation processing of the light pattern A in the first embodiment.
Figure 8B:
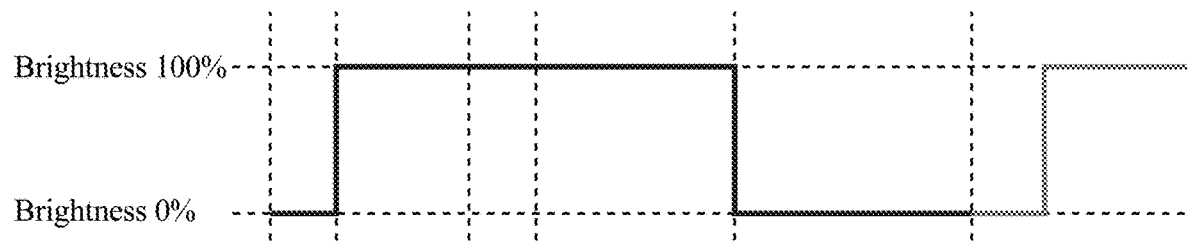
FIG. 8B is a timing chart illustrating other irradiation processing of the light pattern B in the first embodiment.

FIG. 8A is a timing chart illustrating irradiation processing of the light pattern A by the light 4a-2 which is merely capable of controlling the brightness to either 0% or 100%, and the irradiation time information a of the light pattern A indicates the relationship between the brightness and time of the light pattern A illustrated in FIG. 8A. FIG. 8B is a timing chart illustrating irradiation processing of the light pattern B by the light 4b-2 which is merely capable of controlling the brightness to either 0% or 100%, and the irradiation time information b of the light pattern B indicates the relationship between the brightness and time of the light pattern B illustrated in FIG. 8B.

The control unit 8 controls and causes the light driver 4a-1 to repeat turning on and off the light 4a-2 on the basis of the irradiation time information a of the light pattern A, and controls and causes the light driver 4b-1 to repeat turning on and off the light 4b-2 on the basis of the irradiation time information b of the light pattern B.

Figure 9:
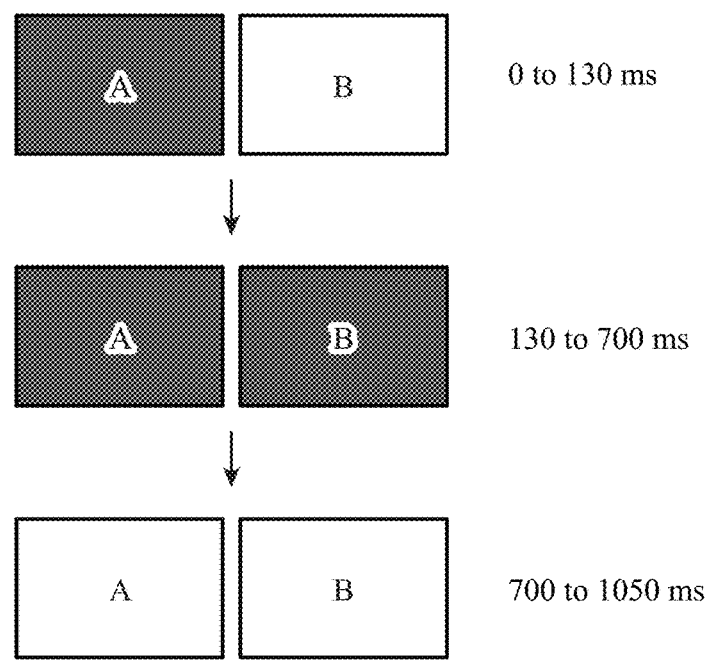
FIG. 9 is a diagram illustrating time-series changes in brightness of the light pattern A in FIG. 8A and the light pattern B in FIG. 8B.

FIG. 9 is a diagram illustrating time-series changes in the brightness of the light pattern A in FIG. 8A and the light pattern B in FIG. 8B. The control unit 8 controls and causes the light driver 4a-1 to start lighting the light 4a-2 from the time point of 0 ms on the basis of the irradiation time information a of the light pattern A illustrated in FIG. 8A.

That is, in a time range of 0 to 130 ms, only the light pattern A becomes 100% bright, and the light pattern A appears in the area near the vehicle body behind the vehicle 100 as illustrated in FIG. 9.

The control unit 8 controls and causes the light driver 4b-1 to start lighting the light 4b-2 on the basis of the irradiation time information b of the light pattern B illustrated in FIG. 8B from a time point of 130 ms. As a result, 100% brightness is maintained for both the light pattern A and the light pattern B in a time range of 130 to 700 ms as illustrated in FIG. 9. In a time range of 700 to 1050 ms, the control unit 8 controls and causes the light driver 4a-1 and the light driver 4b-1 to turn off the lights 4a-2 and 4b-2 as illustrated in FIG. 9.

The control unit 8 controls and causes the light driver 4a-1 to start lighting the light 4a-2 from a time point of 1050 ms on the basis of the irradiation time information a of the light pattern A.

The control unit 8 controls and causes the light driver 4b-1 to start lighting the light 4b-2 with a delay of 130 ms on the basis of the irradiation time information b of the light pattern B in addition to the lighting of the light 4a-2. Thereafter, the control unit 8 performs irradiation processing similar to that described above.

As a result, the animation in which the light pattern A and the light pattern B are repeatedly emitted in the order mentioned is emitted to a road surface outside the vehicle 100.

On the other hand, in a case where light sources, capable of gradually increasing the brightness and capable of complex control of the brightness to allow a brightness less than 100% to be maintained for a certain period of time, are used as light sources of the light 4a-2 and the light 4b-2, emission of the light patterns may be controlled as follows.

Figure 10A:
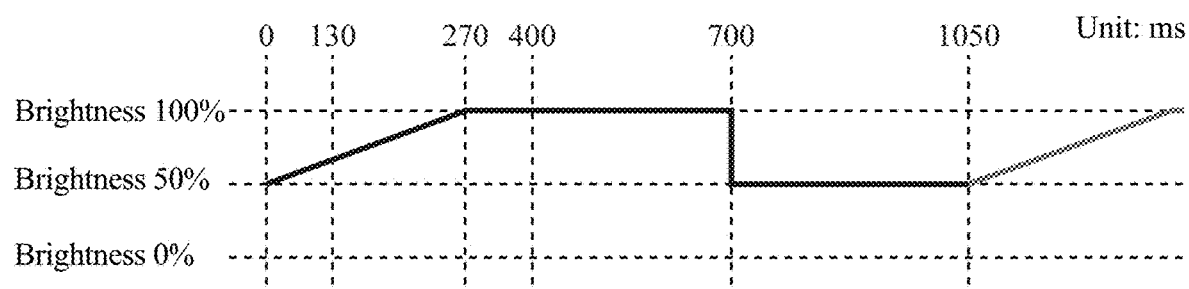
FIG. 10A is a timing chart illustrating still other irradiation processing of the light pattern A in a third embodiment.

FIG. 10A is a timing chart illustrating irradiation processing of the light pattern A by the light 4a-2 which is capable of the complex control of the brightness, and the irradiation time information a of the light pattern A indicates the relationship between the brightness and time of the light pattern A illustrated in FIG. 10A.

Figure 10B:
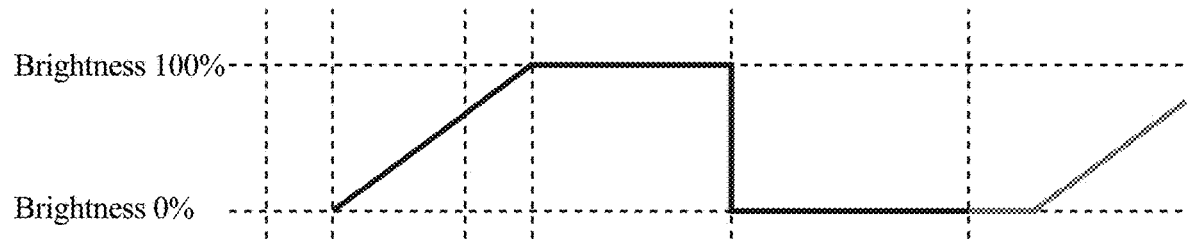
FIG. 10B is a timing chart illustrating still other irradiation processing of the light pattern B in the third embodiment.

FIG. 10B is a timing chart illustrating irradiation processing of the light pattern B by the light 4b-2 which is capable of the complex control of the brightness, and the irradiation time information b of the light pattern B indicates the relationship between the brightness and time of the light pattern B illustrated in FIG. 10B.

The control unit 8 controls and causes the light driver 4a-1 to repeat turning on and off the light 4a-2 on the basis of the irradiation time information a of the light pattern A, and controls and causes the light driver 4b-1 to repeat turning on and off the light 4b-2 on the basis of the irradiation time information b of the light pattern B.

Figure 11:
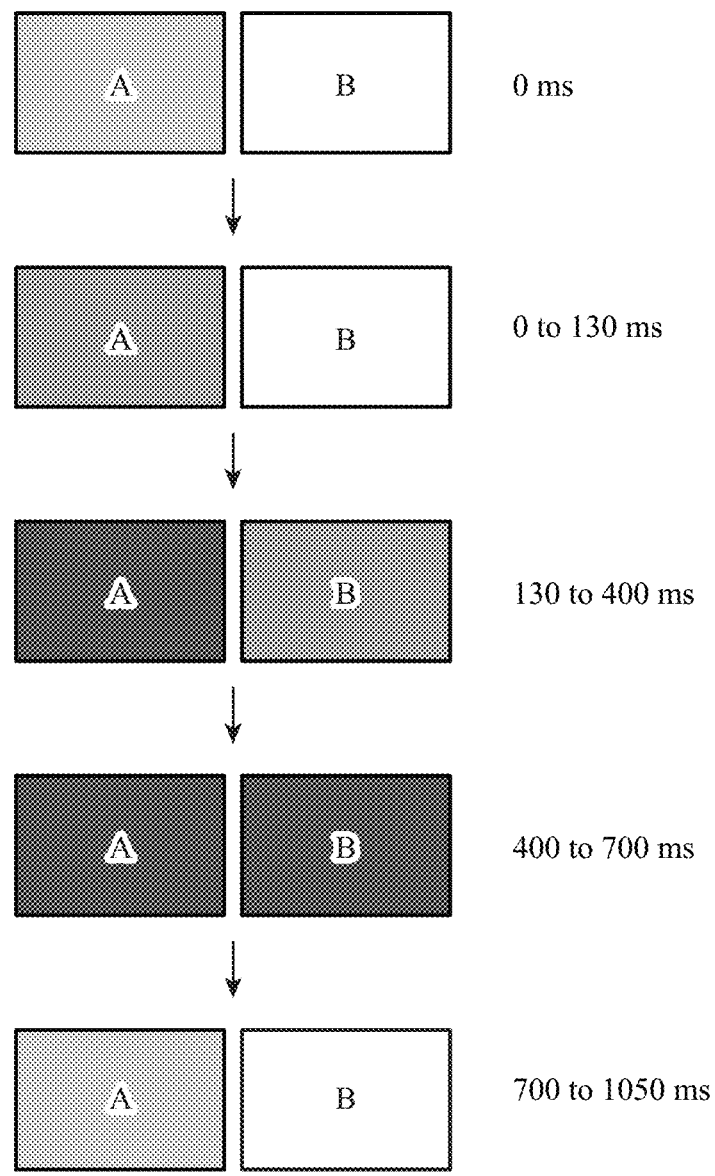
FIG. 11 is a diagram illustrating time-series changes in brightness of the light pattern A in FIG. 10A and the light pattern B in FIG. 10B.

FIG. 11 is a diagram illustrating time-series changes in the brightness of the light pattern A in FIG. 10A and the light pattern B in FIG. 10B. The control unit 8 controls and causes the light driver 4a-1 to start lighting the light 4a-2 from the time point of 0 ms on the basis of the irradiation time information a of the light pattern A illustrated in FIG. 10A. At this point, as illustrated in FIG. 11, the brightness of the light pattern A becomes 50%, and the light pattern A appears in an area near the vehicle body behind the vehicle 100. In the time range of 0 to 130 ms, only the light pattern A gradually becomes brighter as illustrated in FIG. 11.

At the time point of 130 ms, the control unit 8 controls and causes the light driver 4b-1 to start lighting the light 4b-2 on the basis of the irradiation time information b of the light pattern B illustrated in FIG. 10B. In the time range of 130 to 400 ms, the light pattern A becomes 100% bright and the light pattern B becomes about 80% bright at a time point of 270 ms as illustrated in FIGS. 10A and 11. At the time point of 400 ms, the brightness of the light pattern B also reaches 100%. Thereafter, in the time range of 400 to 700 ms, 100% brightness is maintained for both the light pattern A and the light pattern B as illustrated in FIG. 11.

Subsequently, in the time range of 700 to 1050 ms, the control unit 8 controls the light driver 4a-1 and causes the light 4a-2 to emit the light pattern A having a brightness of 50% as illustrated in FIG. 10A. At this point, the control unit 8 controls and causes the light driver 4b-1 to turn off the light 4b-2 as illustrated in FIG. 10B.

The control unit 8 controls and causes the light driver 4a-1 to gradually increase the brightness of the light pattern A emitted by the light 4a-2 from the time point of 1050 ms on the basis of the irradiation time information a of the light pattern A. The control unit 8 controls and causes the light driver 4b-1 to start lighting the light 4b-2 with a delay of 130 ms on the basis of the irradiation time information b of the light pattern B. Thereafter, the control unit 8 performs irradiation processing similar to that described above.

Note that 50%, which is the initial brightness of the light pattern A, can be brighter or darker depending on the maximum brightness of the light sources, the tone of the light sources, the ambient light, the color of the road surface, or the like. As a result, the animation in which the light pattern A and the light pattern B are repeatedly emitted in the order mentioned is emitted to a road surface outside the vehicle 100. In the animation including the light pattern A in FIG. 10A and the light pattern B in FIG. 10B, the light pattern A having a brightness higher than or equal to 50% is always emitted. This reduces the oversight of the animation by a pedestrian or the like present around the vehicle 100, and thus it becomes possible to appropriately raise attention to the presence of the vehicle 100.

The case where both the light pattern A and the light pattern B are rectangular patterns having the same size has been described so far; however, the patterns may have other shapes.

Figure 12A:
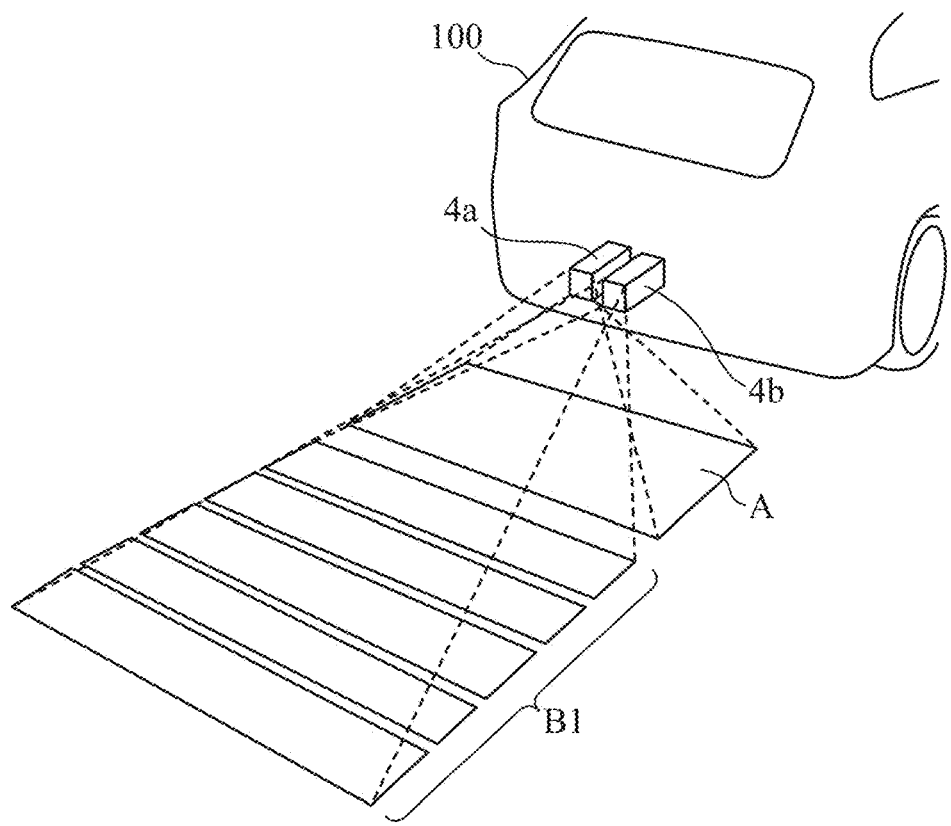
FIG. 12A is a diagram illustrating a state in which another animation of the first embodiment is emitted onto the road surface behind the vehicle.
Figure 12B:
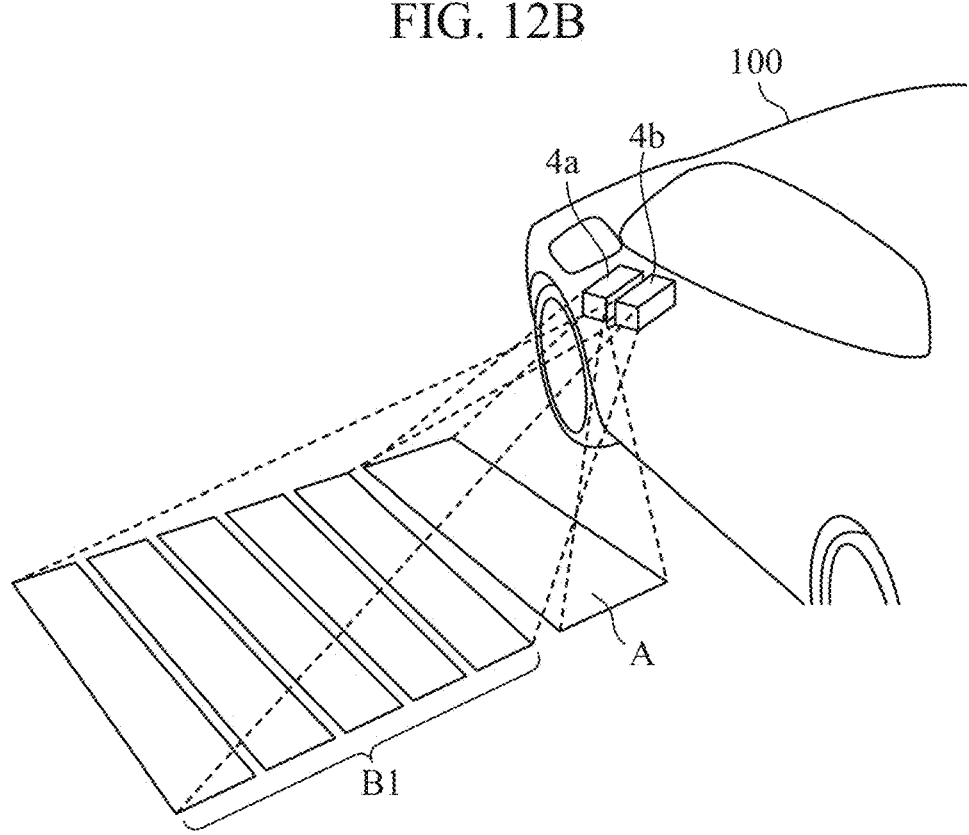
FIG. 12B is a diagram illustrating a state in which the animation of FIG. 12A is emitted onto a road surface on a side of the vehicle.

For example, FIG. 12A is a diagram illustrating a state in which another animation of the first embodiment is emitted onto the road surface behind the vehicle 100. FIG. 12B is a diagram illustrating a state in which the animation of FIG. 12A is emitted onto a road surface on a side of the vehicle 100.

The animations illustrated in FIGS. 12A and 12B include the light pattern A and the light pattern B1. The light pattern A is a rectangular pattern like in FIGS. 3A and 3B, whereas the light pattern B1 includes a plurality of light elements aligned in a direction away from the light pattern A. The light pattern B1 has a larger area irradiated with the plurality of elements than that of the light pattern A, and the plurality of elements is arranged on the same straight line as the element of the light pattern A.

By dividing the light pattern B1 emitted to the area away from the vehicle body into the plurality of elements along the direction away from the side closer to the vehicle body, a pedestrian or the like around the vehicle becomes more likely to pay attention to the plurality of elements of the light pattern B1, and thus it becomes possible to appropriately raise attention to the presence of the vehicle 100.

Figure 13A:
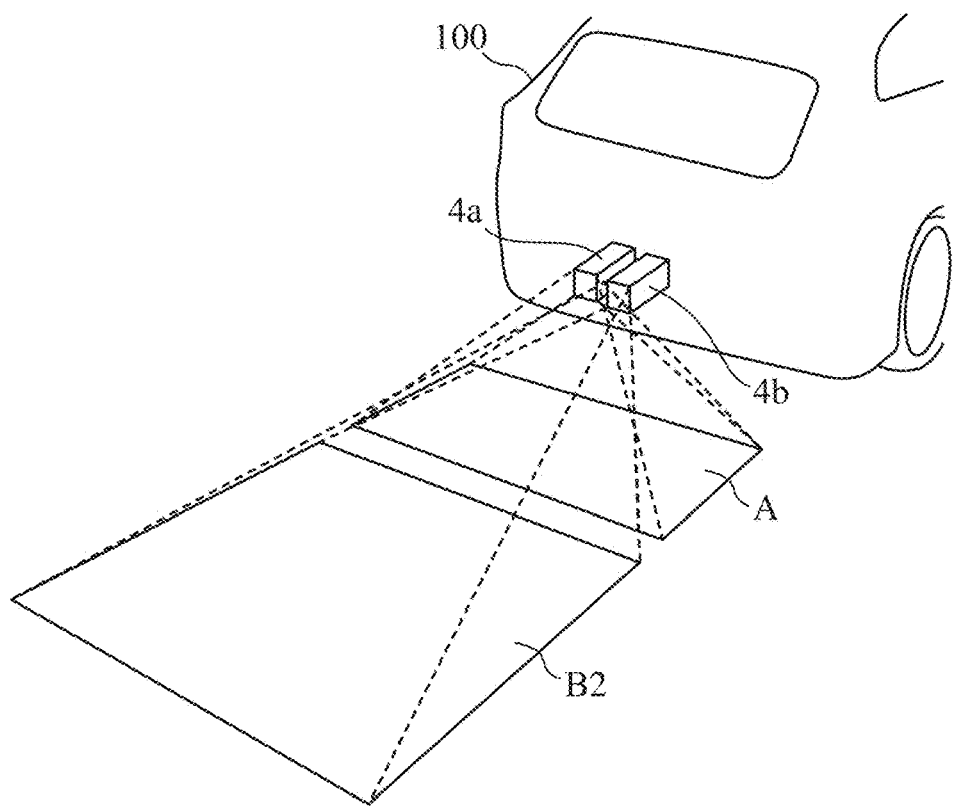
FIG. 13A is a diagram illustrating a state in which still another animation of the first embodiment is emitted onto the road surface behind the vehicle.
Figure 13B:
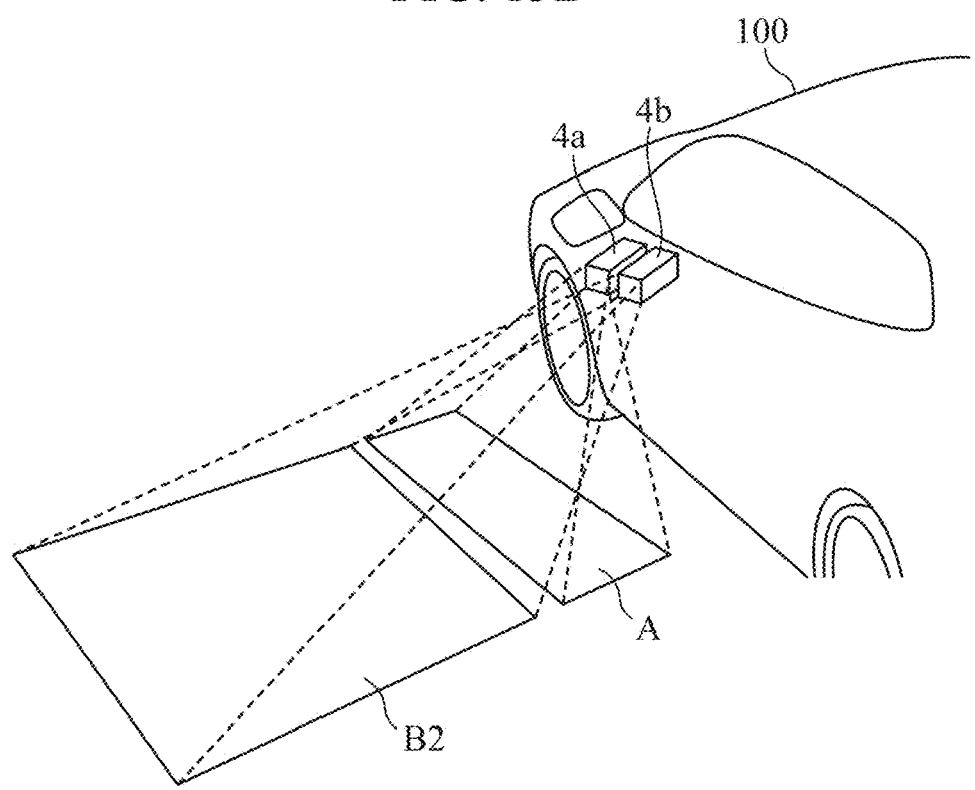
FIG. 13B is a diagram illustrating a state in which the animation of FIG. 13A is emitted onto a road surface on a side of the vehicle.

FIG. 13A is a diagram illustrating a state in which still another animation of the first embodiment is emitted onto the road surface behind the vehicle 100. FIG. 13B is a diagram illustrating a state in which the animation of FIG. 13A is emitted onto a road surface on a side of the vehicle 100. The animations illustrated in FIGS. 13A and 13B include the light pattern A and the light pattern B2.

The light pattern A includes a rectangular element like in FIGS. 3A and 3B, and the light pattern B2 has a larger area irradiated with an element than that of the light pattern A.

By increasing the area of the light pattern B2 emitted to an area farther away from the vehicle body to be larger than the area of the light pattern A that is on the side closer to the vehicle body, a pedestrian or the like around the vehicle becomes more likely to pay attention to the pattern having a larger area, and thus it becomes possible to appropriately raise attention to the presence of the vehicle 100.

Figure 14A:
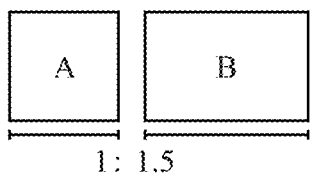
FIG. 14A is a diagram illustrating the light pattern A and the light pattern B having an irradiation area ratio of 1:1.5.
Figure 14B:
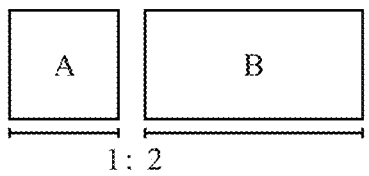
FIG. 14B is a diagram illustrating the light pattern A and the light pattern B having an irradiation area ratio of 1:2.
Figure 14C:
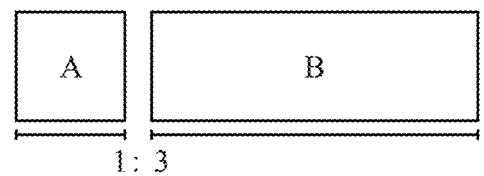
FIG. 14C is a diagram illustrating the light pattern A and the light pattern B having an irradiation area ratio of 1:3.
Figure 14D:
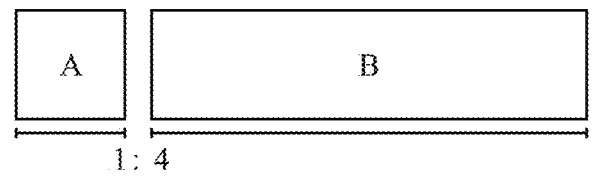
FIG. 14D is a diagram illustrating the light pattern A and the light pattern B having an irradiation area ratio of 1:4.

FIG. 14A is a diagram illustrating the light pattern A and the light pattern B having an irradiation area ratio of 1:1.5. FIG. 14B is a diagram illustrating the light pattern A and the light pattern B having an irradiation area ratio of 1:2. FIG. 14C is a diagram illustrating the light pattern A and the light pattern B having an irradiation area ratio of 1:3. FIG. 14D is a diagram illustrating the light pattern A and the light pattern B having an irradiation area ratio of 1:4. For example, by increasing the irradiation area ratio of the light pattern B to the light pattern A, it becomes possible to raise attention with respect to a pedestrian around the vehicle or the like in an area farther away from the vehicle body.

Figure 15:
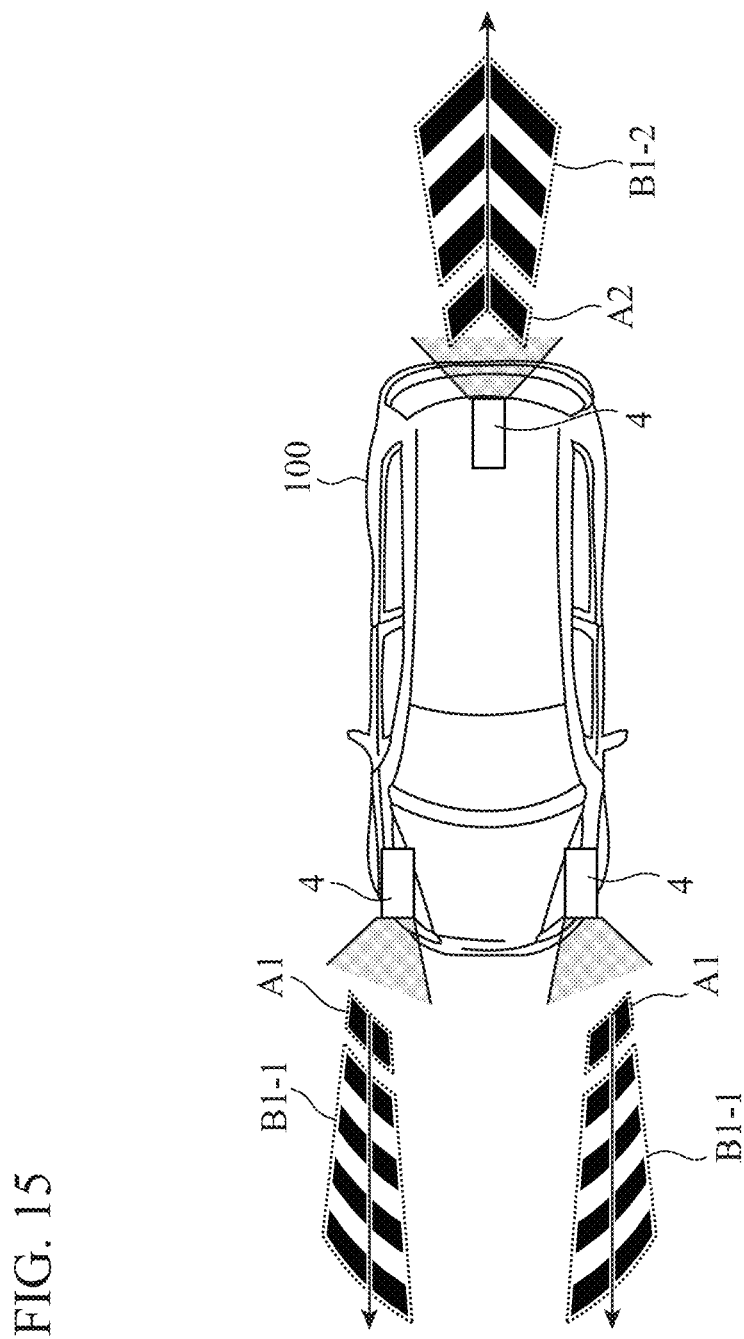
FIG. 15 is a top view illustrating an animation emitted onto the road surface in the traveling direction and the backward traveling direction of the vehicle in the first embodiment.

FIG. 15 is a top view illustrating animations emitted onto the road surfaces in the traveling direction and the backward traveling direction of the vehicle 100. In FIG. 15, light devices 4 are provided at each of the front left side and the front right side of the vehicle 100, and a light device 4 is also provided at the rear side of the vehicle 100.

The light devices 4 provided at each of the front left side and the front right side of the vehicle 100 emit animations onto the road surface in the traveling direction of the vehicle 100. The light device 4 provided at the rear side of the vehicle 100 emits an animation on the road surface behind the vehicle 100.

The animations emitted onto the road surface in the traveling direction of the vehicle 100 include a light pattern A1 and a light pattern B1-1, and shines in the order of the light pattern A1 to the light pattern B1-1 as indicated by arrows. A light pattern A1 includes a single element having a rectangular shape. A light pattern B1-1 is arranged on the same straight line as the light pattern A1, and includes a plurality of elements having the same shape as that of the light pattern A1.

Note that the plurality of elements included in the light pattern B1-1 has a shape gradually increasing along a direction away from a light pattern A1.

The control unit 8 controls and causes the first light device 4a and the second light device 4b to repeat emission in the order of the light pattern A1 to the light pattern B1-1 when the determination unit 7 determines a situation where the light patterns are to be emitted in the traveling direction of the vehicle 100.

For example, the control unit 8 controls and causes the light driver 4a-1 to turn on and off the light 4a-2 on the basis of irradiation time information of the light pattern A1, and controls and causes the light driver 4b-1 to turn on and off the light 4b-2 on the basis of irradiation time information of the light pattern B1-1.

As a result, the animations, in which the light pattern A1 and the light pattern B1-1 are repeatedly emitted in the order mentioned, are emitted onto the road surface in the traveling direction of the vehicle 100, and thus it becomes possible to appropriately raise attention to the presence of the vehicle 100 while the traveling direction of the vehicle 100 is indicated. When a traffic user around the vehicle 100 becomes aware in advance of the traveling direction of the vehicle 100 from the animations, a vehicle that the traffic user is driving can take an action to avoid the vehicle 100, or the brake of the vehicle that the traffic user is driving can be stepped on at an early stage.

An animation emitted onto the road surface behind the vehicle 100 includes a light pattern A2 and a light pattern B1-2, and shines in the order of the light pattern A2 to the light pattern B1-2 as indicated by an arrow. The light pattern A2 includes a single element having an arrowhead shape that is protruding in the direction away from the vehicle body. The light pattern B1-2 is arranged on the same straight line as the light pattern A2, and includes a plurality of elements having the same shape as that of the light pattern A2.

Note that the plurality of elements included in the light pattern B1-2 has a shape gradually increasing along a direction away from the light pattern A2.

The control unit 8 controls and causes the first light device 4a and the second light device 4b to repeat emission in the order of the light pattern A2 to the light pattern B1-2 when the determination unit 7 determines a situation where the light patterns are to be emitted in the backward traveling direction of the vehicle 100.

For example, the control unit 8 controls and causes the light driver 4a-1 to turn on and off the light 4a-2 on the basis of irradiation time information of the light pattern A2, and controls and causes the light driver 4b-1 to turn on and off the light 4b-2 on the basis of irradiation time information of the light pattern B1-2.

As a result, the animation, in which the light pattern A2 and the light pattern B1-2 are repeatedly emitted in the order mentioned, is emitted onto the road surface in the backward traveling direction of the vehicle 100, and thus it becomes possible to appropriately raise attention to the presence of the vehicle 100 while the traveling direction of the vehicle 100 is indicated. When a traffic user around the vehicle 100 becomes aware in advance of the traveling direction of the vehicle 100 from the animations, a vehicle that the traffic user is driving can take an action to avoid the vehicle 100, or the brake of the vehicle that the traffic user is driving can be stepped on at an early stage.

Figure 16:
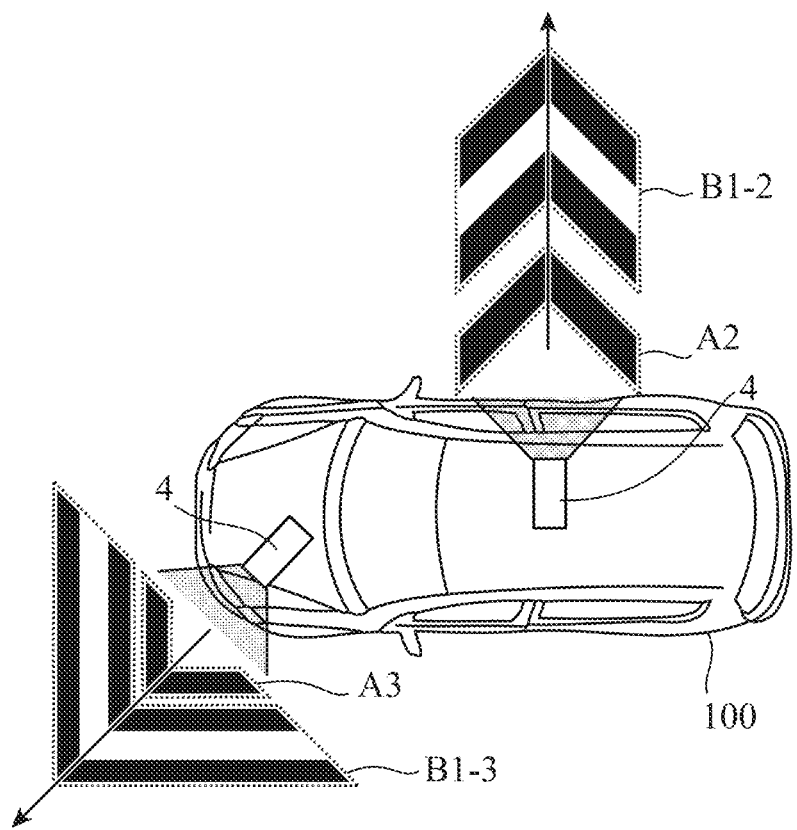
FIG. 16 is a top view illustrating animations emitted onto road surfaces in left/right-turn directions of the vehicle in the first embodiment.

FIG. 16 is a top view illustrating animations emitted onto road surfaces in left/right-turn directions of the vehicle 100 in the first embodiment. In FIG. 16, a light device 4 is provided at the right side of the vehicle 100, and a light device 4 is provided at the front left side of the vehicle 100.

The light device 4 provided at the right side of the vehicle 100 emits an animation onto the road surface in the right-turn direction of the vehicle 100. The light device 4 provided at the front left side of the vehicle 100 emits an animation onto the road surface in the left-turn direction of the vehicle 100.

The animation emitted onto the road surface in the right-turn direction of the vehicle 100 includes a light pattern A2 and a light pattern B1-2, and shines in the order of the light pattern A2 to the light pattern B1-2 as indicated by an arrow. Like in FIG. 15, the light pattern A2 includes a single element having an arrowhead shape that is protruding in the direction away from the vehicle body. The light pattern B1-2 is arranged on the same straight line as the light pattern A2, and includes a plurality of elements having the same shape as that of the light pattern A2.

Note that the plurality of elements included in the light pattern B1-2 illustrated in FIG. 16 has the same size as that of the light pattern A2.

The control unit 8 controls and causes the first light device 4a and the second light device 4b to repeat emission in the order of the light pattern A1 to the light pattern B1-1 when the determination unit 7 determines a situation where the light patterns are to be emitted in the right-turn direction of the vehicle 100.

For example, the control unit 8 controls and causes the light driver 4a-1 to turn on and off the light 4a-2 on the basis of irradiation time information of the light pattern A1, and controls and causes the light driver 4b-1 to turn on and off the light 4b-2 on the basis of irradiation time information of the light pattern B1-1.

As a result, the animation, in which the light pattern A1 and the light pattern B1-1 are repeatedly emitted in the order mentioned, is emitted onto the road surface in the right-turn direction of the vehicle 100, and thus it becomes possible to appropriately raise attention to the presence of the vehicle 100 while the traveling direction of the vehicle 100 is indicated. When a traffic user around the vehicle 100 becomes aware in advance of the traveling direction of the vehicle 100 from the animations, a vehicle that the traffic user is driving can take an action to avoid the vehicle 100, or the brake of the vehicle that the traffic user is driving can be stepped on at an early stage.

An animation emitted onto the road surface in the left-turn direction of the vehicle 100 includes a light pattern A3 and a light pattern B1-3, and shines in the order of the light pattern A3 to the light pattern B1-3 as indicated by an arrow. The light pattern A3 includes a single element having an arrowhead shape that is protruding in the direction away from the vehicle body. The light pattern B1-3 is arranged on the same curved line as the light pattern A3, and includes a plurality of elements having the same shape as that of the light pattern A3.

Note that the plurality of elements included in the light pattern B1-3 has a shape gradually increasing along a direction away from the light pattern A3.

The control unit 8 controls and causes the first light device 4a and the second light device 4b to repeat emission in the order of the light pattern A3 to the light pattern B1-3 when the determination unit 7 determines a situation where the light patterns are to be emitted in the left-turn direction of the vehicle 100.

For example, the control unit 8 controls and causes the light driver 4a-1 to turn on and off the light 4a-2 on the basis of irradiation time information of the light pattern A3, and controls and causes the light driver 4b-1 to turn on and off the light 4b-2 on the basis of irradiation time information of the light pattern B1-3.

As a result, the animation, in which the light pattern A3 and the light pattern B1-3 are repeatedly emitted in the order mentioned, is emitted onto the road surface in the left-turn direction of the vehicle 100, and thus it becomes possible to appropriately raise attention to the presence of the vehicle 100 while the traveling direction of the vehicle 100 is indicated. When a traffic user around the vehicle 100 becomes aware in advance of the traveling direction of the vehicle 100 from the animations, a vehicle that the traffic user is driving can take an action to avoid the vehicle 100, or the brake of the vehicle that the traffic user is driving can be stepped on at an early stage.

Figure 17:
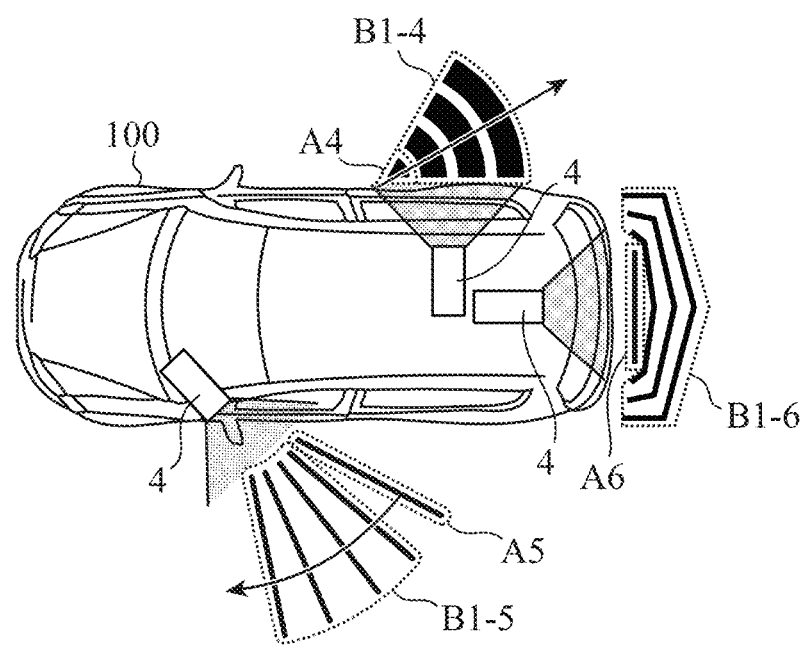
FIG. 17 is a top view illustrating animations emitted onto the road surfaces on the door side of the vehicle in the first embodiment.

FIG. 17 is a top view illustrating animations emitted onto the road surfaces on the door side of the vehicle 100 in the first embodiment. In FIG. 17, a light device 4 is provided at the side of the rear right door of the vehicle 100, a light device 4 is provided at the side of the front left door of the vehicle 100, and a light device 4 is provided at the rear hatch of the vehicle 100.

The light device 4 provided at the side of the rear right door of the vehicle 100 emits an animation onto the road surface on the side of the rear right door. The light device 4 provided at the side of the front left door of the vehicle 100 emits an animation onto the road surface on the side of the front left door. In addition, the light device 4 provided at the rear hatch of the vehicle 100 emits an animation on the road surface in front of the rear hatch.

The animation emitted onto the road surface on the side of the rear right door of the vehicle 100 includes a light pattern A4 and a light pattern B1-4, and shines in the order of the light pattern A4 to the light pattern B1-4 as indicated by an arrow.

The light pattern A4 includes a single element having a fan-shape. The light pattern B1-4 is arranged on the same straight line as the light pattern A4, and includes a plurality of elements having the same shape as that of the light pattern A4.

Note that the plurality of elements included in the light pattern B1-4 has a shape gradually increasing along a direction away from the light pattern A3.

The control unit 8 controls and causes the first light device 4a and the second light device 4b to repeat emission in the order of the light pattern A4 to the light pattern B1-4 when the determination unit 7 determines a situation where the light patterns are to be emitted on the side of the rear right door of the vehicle 100.

For example, the control unit 8 controls and causes the light driver 4a-1 to turn on and off the light 4a-2 on the basis of irradiation time information of the light pattern A4, and controls and causes the light driver 4b-1 to turn on and off the light 4b-2 on the basis of irradiation time information of the light pattern B1-4.

As a result, the animation, in which the light pattern A4 and the light pattern B1-4 are repeatedly emitted in the order mentioned, is emitted onto the road surface on the side of the rear right door, and thus it becomes possible to appropriately raise attention to the presence of the door while the opening/closing direction of the rear right door and the area where the opening/closing operation is performed is indicated. When a traffic user around the vehicle 100 becomes aware in advance that a door of the vehicle 100 opens from the animation, a vehicle that the traffic user is driving can take an action to avoid the vehicle 100, or the brake of the vehicle that the traffic user is driving can be stepped on at an early stage.

An animation emitted onto the road surface on the side of the front left door of the vehicle 100 includes a light pattern A5 and a light pattern B1-5, and shines in the order of the light pattern A5 to the light pattern B1-5 as indicated by an arrow.

The light pattern A5 includes a single element having a strip shape extending in a direction protruding from the left side of the vehicle body.

The light pattern B1-5 is arranged on the same curved line as the light pattern A5, and includes a plurality of elements having the same shape as that of the light pattern A5.

Note that the plurality of elements included in the light pattern B1-5 has a shape gradually increasing along a direction away from the light pattern A5.

The control unit 8 controls and causes the first light device 4a and the second light device 4b to repeat emission in the order of the light pattern A5 to the light pattern B1-5 when the determination unit 7 determines a situation where the light patterns are to be emitted on the side of the rear right door of the vehicle 100.

For example, the control unit 8 controls and causes the light driver 4a-1 to turn on and off the light 4a-2 on the basis of irradiation time information of the light pattern A5, and controls and causes the light driver 4b-1 to turn on and off the light 4b-2 on the basis of irradiation time information of the light pattern B1-5.

As a result, the animation, in which the light pattern A5 and the light pattern B1-5 are repeatedly emitted in the order mentioned, is emitted onto the road surface on the side of the front left door, and thus it becomes possible to appropriately raise attention to the presence of the door while the opening/closing direction of the front left door and the area where the opening/closing operation is performed are indicated. When a traffic user around the vehicle 100 becomes aware in advance that a door of the vehicle 100 opens from the animation, a vehicle that the traffic user is driving can take an action to avoid the vehicle 100, or the brake of the vehicle that the traffic user is driving can be stepped on at an early stage.

Note that the light pattern A5 and the light pattern B1-5 may be emitted to a range, protruding from a side of the vehicle body, where the door opens/closes. Pedestrians around the vehicle can accurately grasp the range that protrudes from the side of the vehicle body when the door is opened, by visually recognizing the animation including the light pattern A5 and the light pattern B1-5. This can raise attention to the presence of the door.

An animation emitted onto the road surface in front of the rear hatch includes a light pattern A6 and a light pattern B1-6.

The light pattern A6 includes a single band-shaped element extending in the vehicle body width direction.

The light pattern B1-6 is arranged on the same straight line as the light pattern A6, and includes a plurality of elements having the same shape as the light pattern A6.

Note that the plurality of elements included in the light pattern B1-6 has a shape gradually increasing along a direction away from the light pattern A6.

The control unit 8 controls and causes the first light device 4a and the second light device 4b to repeat emission in the order of the light pattern A6 to the light pattern B1-6 when the determination unit 7 determines a situation where the light patterns are to be emitted in front of the rear hatch.

For example, the control unit 8 controls and causes the light driver 4a-1 to turn on and off the light 4a-2 on the basis of irradiation time information of the light pattern A6, and controls and causes the light driver 4b-1 to turn on and off the light 4b-2 on the basis of irradiation time information of the light pattern B1-6.

As a result, the animation, in which the light pattern A6 and the light pattern B1-6 are repeatedly emitted in the order mentioned, is emitted onto the road surface in front of the rear hatch, and thus it becomes possible to appropriately raise attention to the presence of the rear hatch while the opening/closing direction of the rear hatch and the area where the opening/closing operation is performed are indicated.

When a traffic user around the vehicle 100 becomes aware in advance that the rear hatch of the vehicle 100 opens from the animation, a vehicle that the traffic user is driving can take an action to avoid the vehicle 100, or the brake of the vehicle that the traffic user is driving can be stepped on at an early stage.

As described above, in the irradiation system 3 according to the first embodiment, the second light device 4b starts emission of the light pattern B after the first light device 4a has started emission of the light pattern A. This eliminates the need for an image projector as described in Patent Literature 1, and it becomes possible to implement emission of an animation including the light pattern A and the light pattern B with a simple configuration including the first light device 4a and the second light device 4b.

As described in Patent Literature 1, in the related art, large-scale irradiation systems have been used to implement emission of a complicated light pattern that suggests a traveling direction of a vehicle.

As a result of extensive research and repeated experiments on a simpler configuration capable of emitting an animation, the inventors of the present application have found that emission of animation can be implemented with a configuration including two irradiation units.

Specifically, after the start of emission of the light pattern A including a single element, emission of the light pattern B, including a single or a plurality of elements aligned in a direction away from the element of the light pattern A, is started. As a result, a viewer's attention is directed in the order of the light pattern A to the light pattern B, and the viewer visually recognizes as an animation in which the emission state of the elements appears to be continuously changing in the order of the light pattern A to the light pattern B.

That is, animation emission can be implemented with a simple configuration including the first irradiation unit that emits the light pattern A and the second irradiation unit that emits the light pattern B.

Furthermore, the inventors of the present application have experimented whether emission of an animation, suggesting that a door of a vehicle is to be opened, onto the surroundings of the vehicle allows a bicycle approaching the vehicle to take an action to avoid the vehicle, or whether the brake of the bicycle can be applied at an early stage away from the vehicle. As a result, it was made clear that it became possible for the bicycle to perform at least one of taking an action to avoid the vehicle or applying the brake of the bicycle at an early stage away from the vehicle.

In the irradiation system 3 according to the first embodiment, the light pattern A is arranged between the vehicle 100, including the first light device 4a and the second light device 4b, and the light pattern B. As a result, it becomes possible to implement emission of an animation in which the light elements continuously change from the side closer to the vehicle 100 to the side farther from the vehicle 100.

In the irradiation system 3 according to the first embodiment, the area of the light pattern B is larger than that of the light pattern A. As a result, a pedestrian or the like around the vehicle becomes more likely to pay attention to the pattern having a larger area, and thus it becomes possible to appropriately raise attention to the presence of the vehicle 100.

In the irradiation system 3 according to the first embodiment, the control unit 8 controls and causes the first light device 4a and the second light device 4b to match the timing of stopping the emission of the light pattern A and the timing of stopping the emission of the light pattern B. With such control, it becomes possible to visually and clearly recognize the beginning and the end of the animation including the light pattern A and the light pattern B.

In the irradiation system 3 according to the first embodiment, the control unit 8 controls and causes the first light device 4a and the second light device 4b to repeat emission in the order of the light pattern A to the light pattern B so that the light pattern A has a lightness higher than or equal to a lower limit. With such control, the oversight of the animation by a pedestrian or the like present around the vehicle 100 is reduced, and thus it becomes possible to appropriately raise attention to the presence of the vehicle 100.

The irradiation system 3 according to the first embodiment includes the information acquisition unit 6 and the determination unit 7.

The information acquisition unit 6 acquires information inside and outside the vehicle. The determination unit 7 determines whether the vehicle 100 is in a situation where the light patterns are to be emitted on the basis of the information inside and outside the vehicle acquired by the information acquisition unit 6. The control unit 8 controls and causes the first light device 4a and the second light device 4b to repeat emission in the order of the light pattern A to the light pattern B when the determination unit 7 determines that the vehicle 100 is in a situation where the light patterns are to be emitted.

With such configuration, the light patterns can be emitted when the vehicle 100 is in a situation where the light patterns are to be emitted, and thus it becomes possible to appropriately raise attention to the presence of the vehicle 100 while the traveling direction of the vehicle 100 is indicated to the surroundings of the vehicle 100.

In the irradiation system 3 according to the first embodiment, the light pattern B is divided into a plurality of segments along a direction away from the side closer to the vehicle body. As a result, a pedestrian or the like around the vehicle becomes more likely to pay attention to the plurality of divided patterns, and thus it becomes possible to appropriately raise attention to the presence of the vehicle 100.

In the irradiation system 3 according to the first embodiment, the control unit 8 controls and causes the first light device 4a and the second light device 4b to repeat emission in the order of the light pattern A to the light pattern B so that the light pattern A has a lightness higher than or equal to a lower limit.

This reduces the oversight of the animation by a pedestrian or the like present around the vehicle 100, and thus it becomes possible to appropriately raise attention to the presence of the vehicle 100.

In the irradiation system 3 according to the first embodiment, the first light device 4a and the second light device 4b are provided at each of the front side and the rear side of the vehicle 100.

When the determination unit 7 determines a situation where the vehicle 100 is to travel, the control unit 8 repeats emission in the order of the light pattern A to the light pattern B onto the road surface in the traveling direction of the vehicle 100.

When the determination unit 7 determines a situation where the vehicle 100 is to travel backward, the control unit 8 repeats emission in the order of the light pattern A to the light pattern B onto the road surface in the backward traveling direction of the vehicle 100.

With such configuration, it becomes possible to appropriately raise attention to the presence of the vehicle 100 while the traveling direction of the vehicle 100 is indicated by the animation.

In the irradiation system 3 according to the first embodiment, the first light device 4a and the second light device 4b are provided at each of the left side and the right side of the vehicle 100.

When the determination unit 7 determines a situation where the vehicle 100 is to turn right, the control unit 8 repeats emission in the order of the light pattern A to the light pattern B onto the road surface in the right side direction of the vehicle 100.

When the determination unit 7 determines a situation where the vehicle 100 is to turn left, the control unit 8 repeats emission in the order of the light pattern A to the light pattern B onto the road surface in the left side direction of the vehicle 100.

With such configuration, it becomes possible to appropriately raise attention to the presence of the vehicle 100 while the traveling direction of the vehicle 100 is indicated by the animation.

In the irradiation system 3 according to the first embodiment, the first light device 4a and the second light device 4b are provided at a door of the vehicle 100.

When the determination unit 7 determines a situation where a door of the vehicle 100 is to be opened, the control unit 8 repeats emission in the order of the light pattern A to the light pattern B onto the road surface on the door side of the vehicle 100. With such configuration, it becomes possible to appropriately raise attention to the presence of the vehicle 100 while the traveling direction of the vehicle 100 is indicated by the animation.

In the irradiation system 3 according to the first embodiment, the first light device 4a and the second light device 4b emit a light pattern on a range, protruding from a side of the vehicle body, where the door opens/closes. With such a configuration, it becomes possible to raise attention to the presence of the door while the opening/closing direction of the door and the area where the opening/closing operation is performed are indicated by the animation.

Although the configuration in which the irradiation system 3 includes the information acquisition unit 6 and the determination unit 7 has been illustrated in the above, the first embodiment is not limited thereto.

The irradiation system 3 is only required to implement emission of an animation by controlling the first light device 4a and the second light device 4b, and may not include the information acquisition unit 6 or the determination unit 7.

Although the configuration that the vehicle 100 includes the first light device 4a and the second light device 4b has been described, a main body to include the first light device 4a and the second light device 4b is not limited to the vehicle 100.

For example, a main body is only required to include the first light device 4a and the second light device 4b, and may be a railroad train, a ship, an aircraft, or a fixed irradiation device.

Note that the present invention is not limited to the above embodiments, and a modification of any component of the embodiments, or omission of any component in the embodiments may be adopted within the scope of the present invention.

INDUSTRIAL APPLICABILITY

Since an irradiation system according to the present invention does not require an image projector and is capable of emitting an animation outside the vehicle with a simple configuration, the irradiation system can be used for raising attention of traffic users to the presence of the vehicle.

REFERENCE SIGNS LIST

1: information source, 1a: speed sensor, 1b: steering angle sensor, 1c: shift sensor, 1d: indicator sensor, 1e: door sensor, 1f: onboard camera, 1g: seat belt sensor, 1h: external camera, 1i: external sensor, 1j: GPS device, 1k: navigation device, 2: control ECU, 2a, 30: processor, 2b, 31: ROM, 2c, 32: RAM, 2d: engine, 2e: transmission, 2f: brake actuator, 2g: steering actuator, 2h: indicator, 3: irradiation system, 3a: irradiation control device, 4: light device, 4a: first light device, 4a-1, 4b-1: light driver, 4a-2, 4b-2: light, 4b: second light device, 5: wireless communication device, 5a: antenna, 5b: transmission unit, 5c: reception unit, 6: information acquisition unit, 7: determination unit, 8: control unit, 100: vehicle

The invention claimed is:

1. An irradiation system comprising:
a first irradiator to emit a first light pattern including a single element;
a second irradiator to emit a second light pattern including multiple elements each aligned in a direction away from the single element, the second light pattern aligned in an area away from the single element;
an information acquirer to acquire information pertaining to a vehicle and both inside and outside of the vehicle;
a determiner to make a determination, on a basis of the information acquired by the information acquirer, on whether the vehicle is in a situation where the first light pattern and the second light pattern are to be emitted; and
a controller to control the first irradiator and the second irradiator on a basis of the determination of the determiner so that the second irradiator starts emission of the second light pattern after the first irradiator has started emission of the first light pattern.

2. The irradiation system according to claim 1,
wherein the controller controls the first irradiator and the second irradiator so that the second irradiator starts emission of the second light pattern with the first light pattern being emitted after the first irradiator has started emission of the first light pattern.

3. The irradiation system according to claim 1,
wherein the second irradiator comprises a single light.

4. The irradiation system according to claim 1,
wherein the first light pattern is arranged between a main body, provided with the first irradiator and the second irradiator, and the second light pattern.

5. The irradiation system according to claim 4,
wherein the first irradiator and the second irradiator are provided at a front side and a rear side of the vehicle, and
the controller controls and causes the first irradiator and the second irradiator to repeat emission in an order from the first light pattern to the second light pattern onto a road surface in a traveling direction of the vehicle when the determiner determines a situation where the vehicle travels, and controls and causes the first irradiator and the second irradiator to repeat emission in an order from the first light pattern to the second light pattern onto a road surface in a backward traveling direction of the vehicle when the determiner determines a situation where the vehicle travels backward.

6. The irradiation system according to claim 4,
wherein the first irradiator and the second irradiator are provided at a left side and a right side of the vehicle, and
the controller controls and causes the first irradiator and the second irradiator to repeat emission in an order from the first light pattern to the second light pattern onto a road surface on the right side of the vehicle when the determiner determines a situation where the vehicle turns right, and controls and causes the first irradiator and the second irradiator to repeat emission in an order from the first light pattern to the second light pattern onto a road surface on the left side of the vehicle when the determiner determines a situation where the vehicle turns left.

7. The irradiation system according to claim 4,
wherein the first irradiator and the second irradiator are provided at doors of the vehicle, and
the controller controls and causes the first irradiator and the second irradiator to repeat emission in an order from the first light pattern to the second light pattern onto a road surface on each door side of the vehicle when the determiner determines a situation where a door of the vehicle is opened.

8. The irradiation system according to claim 7,
wherein the first irradiator and the second irradiator emit a light pattern on a range, protruding from each side of the vehicle body, where the door opens/closes.

9. The irradiation system according to claim 1,
wherein the second light pattern has a larger area than that of the first light pattern.

10. The irradiation system according to claim 1,
wherein the controller controls and causes the first irradiator and the second irradiator to equate timing for stopping the emission of the first light pattern with timing for stopping the emission of the second light pattern.

11. An irradiation system comprising:
a first irradiator to emit a first light pattern including a single element;
a second irradiator to emit a second light pattern including a single element or multiple elements each aligned in a direction away from the single element of the first light pattern, the second light pattern aligned in an area away from the single element of the first light pattern;
an information acquirer to acquire information pertaining to a vehicle and both inside and outside of the vehicle;
a determiner to make a determination, on a basis of the information acquired by the information acquirer, on whether the vehicle is in a situation where the first light pattern and the second light pattern are to be emitted; and
a controller to control the first irradiator and the second irradiator on a basis of the determination of the determiner so that the second irradiator starts emission of the second light pattern with the first light pattern being emitted after the first irradiator has started emission of the first light pattern,
wherein the second light pattern is longer than the first light pattern and extends in a direction away from the first light pattern, the second light pattern having a larger area than that of the first light pattern.

12. The irradiation system according to claim 11,
wherein the second irradiator comprises a single light.

13. The irradiation system according to claim 11,
wherein the first light pattern is arranged between a main body, provided with the first irradiator and the second irradiator, and the second light pattern.

14. The irradiation system according to claim 11,
wherein the controller controls and causes the first irradiator and the second irradiator to equate timing for stopping the emission of the first light pattern with timing for stopping the emission of the second light pattern.

15. An irradiation method for an irradiation system including a first irradiator to emit a first light pattern including a single element and a second irradiator to emit a second light pattern including a single element or multiple elements each aligned in a direction away from the single element of the first light pattern, the second light pattern aligned in an area away from the single element of the first light pattern, the method comprising:
acquiring information pertaining to a vehicle and both inside and outside of the vehicle;
making a determination, on a basis of the information acquired by the information acquirer, on whether the vehicle is in a situation where the first light pattern and the second light pattern are to be emitted;
controlling the first irradiator and the second irradiator on a basis of the determination;
starting emission of the first light pattern; and
starting emission of the second light pattern after the emission of the first light pattern has been started.

16. An irradiation method for an irradiation system including a first irradiator to emit a first light pattern including a single element and a second irradiator to emit a second light pattern including a single element or multiple elements each aligned in a direction away from the single element of the first light pattern, the second light pattern aligned in an area away from the single element of the first light pattern, the method comprising:
acquiring information pertaining to a vehicle and both inside and outside of the vehicle;
making a determination, on a basis of the information acquired by the information acquirer, on whether the vehicle is in a situation where the first light pattern and the second light pattern are to be emitted;
controlling starting emission of the first light pattern on a basis of the determination;
starting emission of the second light pattern with the first light pattern being emitted after the emission of the first light pattern has been started, and
wherein the second light pattern is longer than the first light pattern and extends in a direction away from the first light pattern, the second light pattern having a larger area than that of the first light pattern.

17. The irradiation method according to claim 15,
wherein the second irradiator starts emission of the second light pattern with the first light pattern being emitted after the first irradiator has started emission of the first light pattern.

* * * * *